United States Patent
Shinkai et al.

(10) Patent No.: US 7,590,329 B2
(45) Date of Patent: Sep. 15, 2009

(54) RECORDING APPARATUS, EDITOR TERMINAL APPARATUS, RECORDING MEDIUM, AND VIDEO CONTENT EDITING SUPPORT SYSTEM AND METHOD USING THEM

(75) Inventors: Mitsutoshi Shinkai, Kanagawa (JP); Takuji Moriya, Kanagawa (JP)

(73) Assignee: Sony Corporation, Tokyo (JP)

( * ) Notice: Subject to any disclaimer, the term of this patent is extended or adjusted under 35 U.S.C. 154(b) by 876 days.

(21) Appl. No.: 10/407,055

(22) Filed: Apr. 4, 2003

(65) Prior Publication Data
US 2003/0219223 A1    Nov. 27, 2003

(30) Foreign Application Priority Data
Apr. 5, 2002    (JP)    .............................. 2002-104225

(51) Int. Cl.
*H04N 5/93* (2006.01)
(52) U.S. Cl. ...................................................... 386/52
(58) Field of Classification Search .................... 386/52, 386/55, 4, 60–62, 64, 46
See application file for complete search history.

(56) References Cited

U.S. PATENT DOCUMENTS 7,024,095 B1 * 4/2006 Kondou et al. ................. 386/52

FOREIGN PATENT DOCUMENTS

| JP | 11-345481 | 12/1999 |
|---|---|---|
| JP | 2000-306370 | 11/2000 |
| JP | 2001-292398 | 10/2001 |

* cited by examiner

*Primary Examiner*—Thai Tran
*Assistant Examiner*—Tat Chi Chio
(74) *Attorney, Agent, or Firm*—Frommer Lawrence & Haug LLP; William S. Frommer; Paul A. Levy

(57) ABSTRACT

A video content editing support system is disclosed which is made up of a recording apparatus for recording captured video content data to a recording medium, and an editor terminal apparatus for displaying the video content data supplied from the recording apparatus. The system includes: a mark table for converting electronic mark data associated with the video content data into electronic shot mark data on a one-to-one correspondence basis; a recording unit for writing the electronic mark data and the electronic shot mark data to the video content data; and an extraction unit for extracting video data based on the electronic shot mark data written to the video content data.

23 Claims, 22 Drawing Sheets

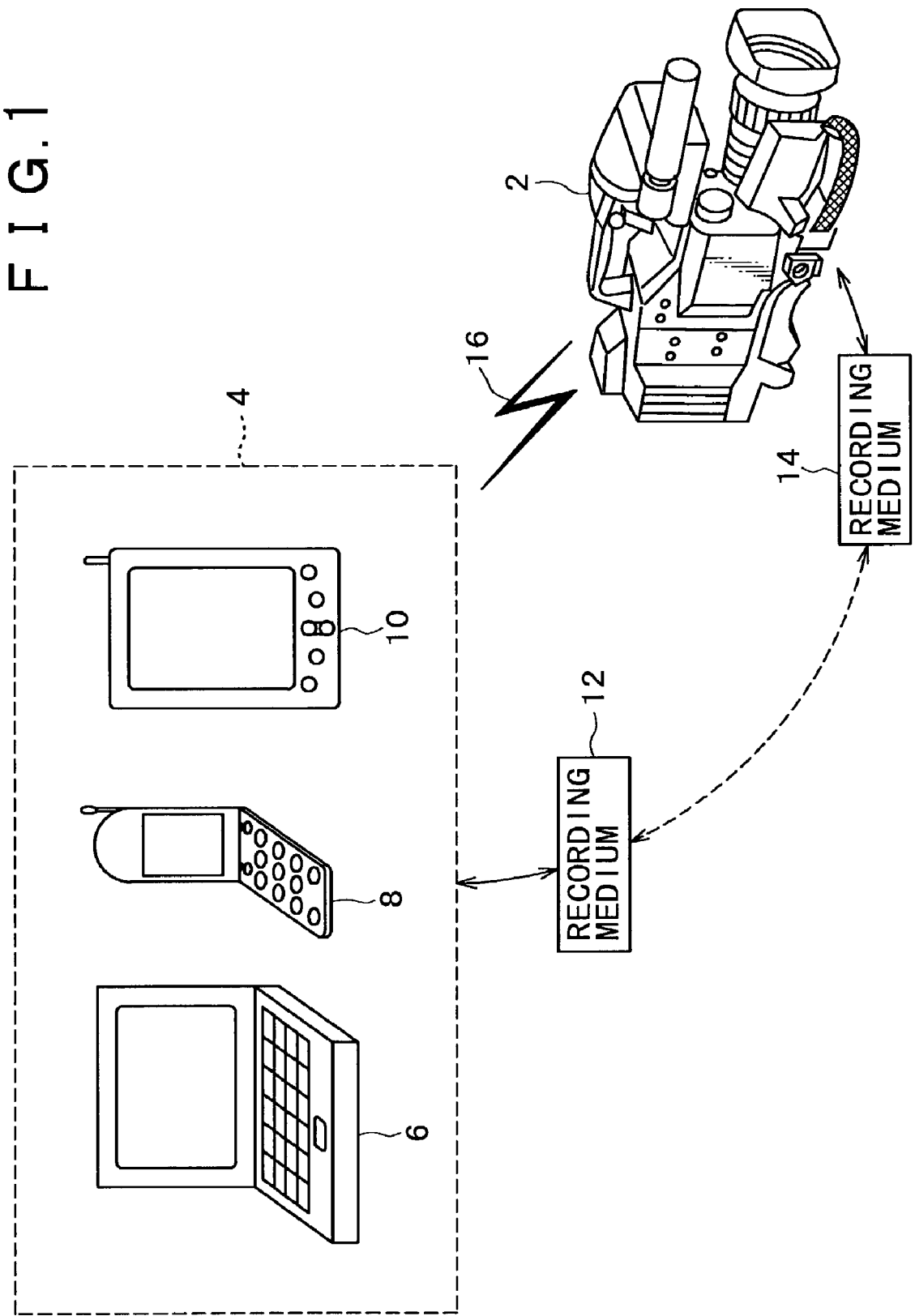

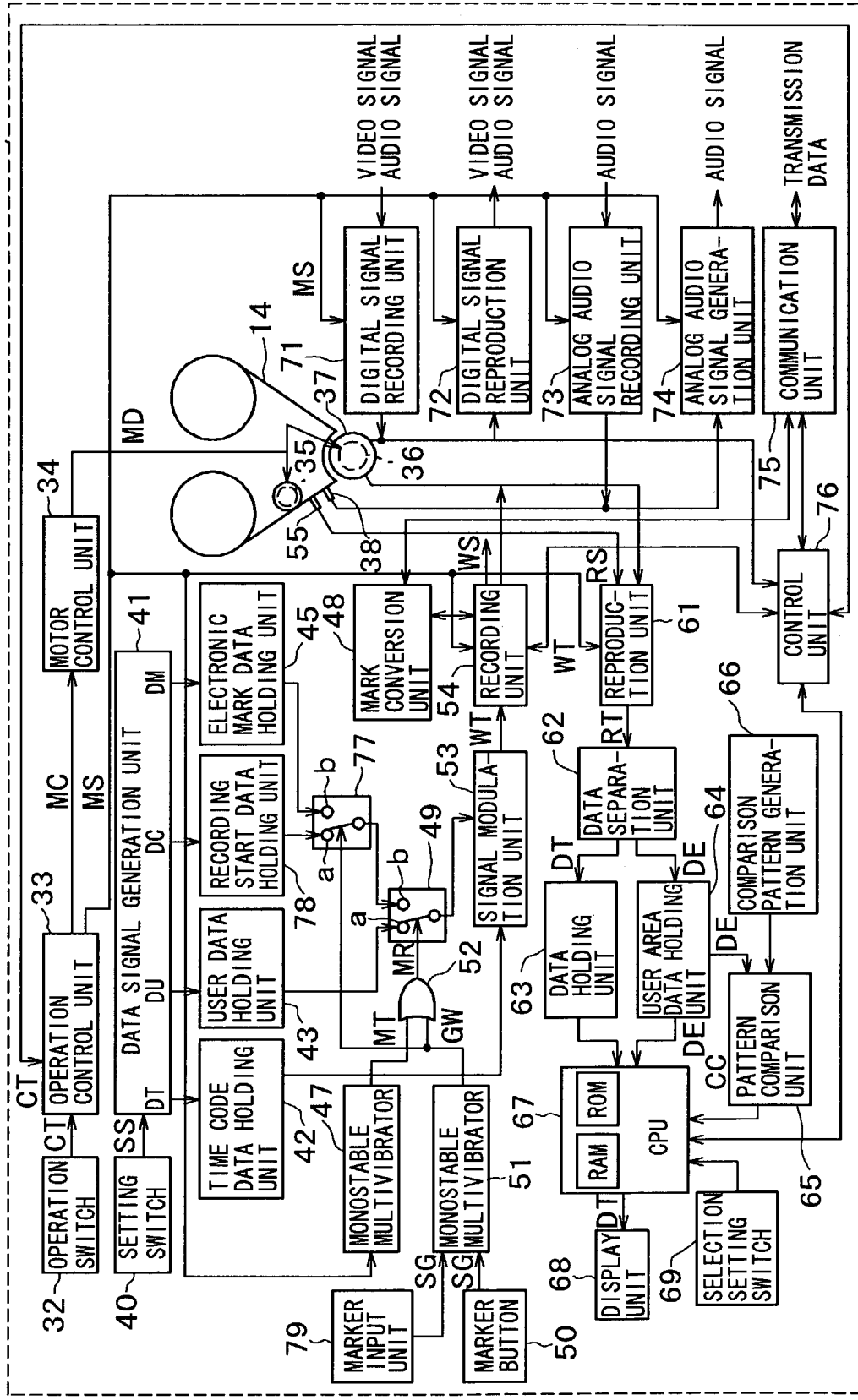

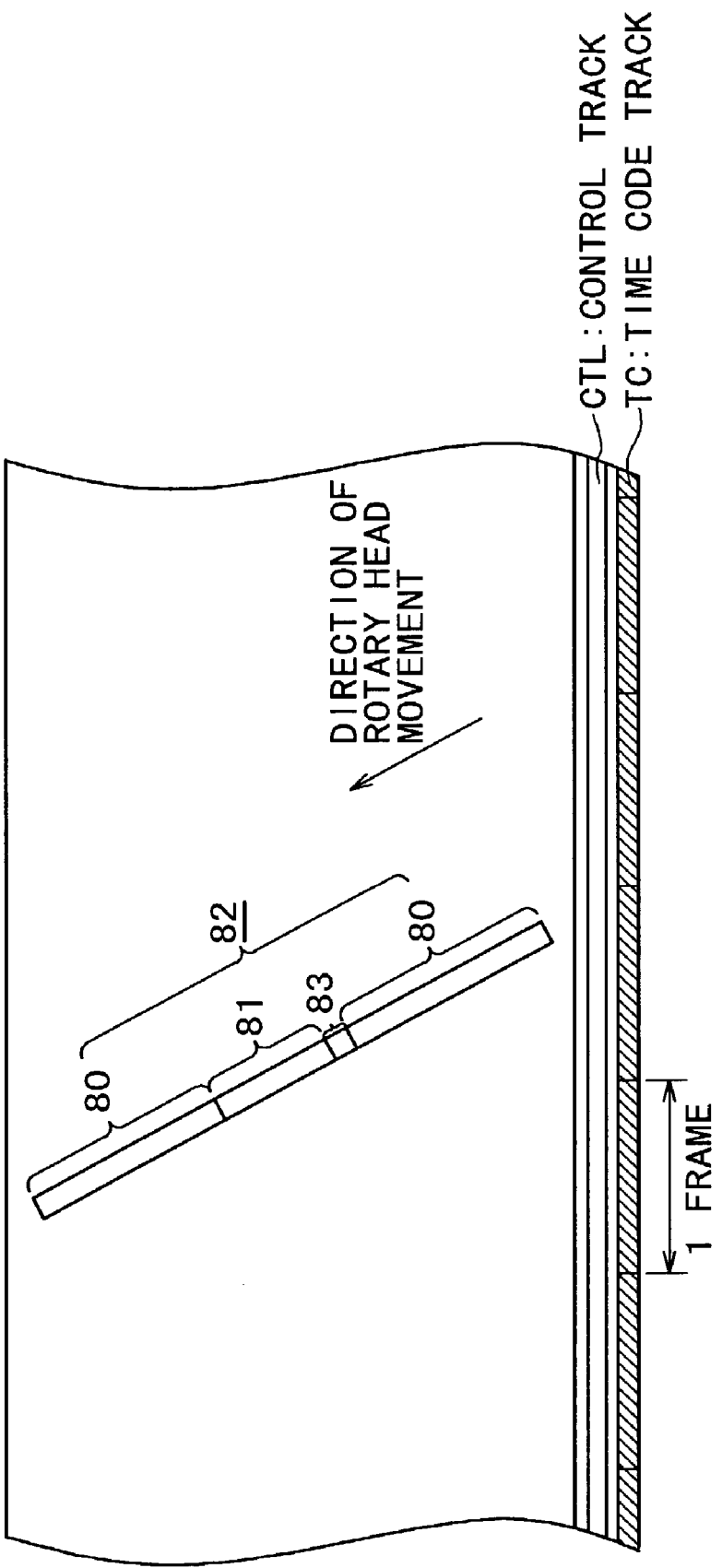

FIG. 5

| HEADER | SYSTEM (5 BYTES) | USER DATA (104 BYTES) | RESERVED (35 BYTES) | PARITY (12 BYTES) |

| HEADER | ELECTRONIC MARK |
|---|---|

| ELECTRONIC MARK DATA | ELECTRONIC SHOT MARK DATA |
|---|---|
| REC START | 20 (h) |
| PITCH | 21 (h) |
| CATCH | 22 (h) |
| THROW | 23 (h) |
| RUN | 24 (h) |
| TOUCH | 25 (h) |
| DIRECT | 26 (h) |
| PROTEST | 27 (h) |
| SWING | 28 (h) |
| HOMERUN | 29 (h) |

902 904

900

| ELECTRONIC MARK DATA | ELECTRONIC SHOT MARK DATA |
|---|---|
| REC START | 20 (h) |
| HIGHLIGHT | 21 (h) |
| ZOOM UP | 22 (h) |
| ZOOM OUT | 23 (h) |
| FRAME IN | 24 (h) |
| FRAME OUT | 25 (h) |
| PAN | 26 (h) |

1000

F I G. 1 0
| ELECTRONIC MARK DATA | ELECTRONIC SHOT MARK DATA |
|---|---|
| REC START | 20 (h) |
| GOOD SHOT | 21 (h) |
800

RECORDING APPARATUS, EDITOR TERMINAL APPARATUS, RECORDING MEDIUM, AND VIDEO CONTENT EDITING SUPPORT SYSTEM AND METHOD USING THEM

BACKGROUND OF THE INVENTION

The present invention relates to an editing system for editing video contents. More particularly, the invention relates to a video content editing support system, an image pickup apparatus, an editor terminal apparatus, a computer program, a recording medium, and a video content editing support method.

Television (TV) news programs are typically broadcast after events in the field have been covered and their raw content materials, i.e., the captured video content data have been edited. There are two ways to edit video content data: rough editing, and final editing. Final editing involves preparing final video content data (a complete package) out of the video content data roughly edited scene by scene.

Rough editing for scene extraction is performed preparatory to final editing. In a typical rough editing process, an editor first selects what he or she considers necessary for a final editing process from video scenes constituting video content data, i.e., raw data captured earlier and left unedited. Each of the selected video scenes is identified by time-based locations (called a time code) composed of an edit start point (an in-point) and an edit end point (an out-point). The time codes are recorded illustratively on sheets of paper so that necessary portions of the selected scenes may be extracted accordingly in the final editing process.

However, in the rough editing process following the image pickup, it is difficult to know what video scenes are included in the video content data or where the necessary scenes are located on the recording medium such as a magnetic tape. This requires that the video content data recorded on the medium be reproduced and rewound repeatedly from beginning to end on a video tape recorder (VTR), so that the editor may select necessary video scenes.

The portion to be used from each of the selected video scenes is determined by use of a time code consisting of an edit start point (in-point) and an edit end point (out-point). The codes are written illustratively on sheets of paper in order to prepare a time code list composed of all necessary time codes.

The need repeatedly to reproduce and rewind the video scenes constituting the video content data has lowered the efficiency in the rough editing process, i.e., where the desired video scenes are to be selected (in what is known as logging) and the necessary portions from the selected scenes are to be extracted.

SUMMARY OF THE INVENTION

The present invention has been made in view of the above circumstances and provides, among others, a novel video content editing support system for allowing necessary video scenes to be selected from video content data and the necessary portions of the selected scenes to be extracted therefrom based on electronic mark data written in advance to the video content data, whereby the efficiency of editing is enhanced significantly.

In carrying out the invention and according to a first aspect thereof, there is provided a video content editing support system made up of a recording apparatus for recording captured video content data to a recording medium, and an editor terminal apparatus for displaying the video content data supplied from the recording apparatus, the system including: a mark table for converting electronic mark data associated with the video content data into electronic shot mark data on a one-to-one correspondence basis; a recording unit for writing the electronic mark data and the electronic shot mark data to the video content data; and an extraction unit for extracting video data based on the electronic shot mark data written to the video content data.

Preferably, the recording unit writes the video content data, the electronic mark data, and the electronic shot mark data substantially in real time.

Preferably, the extraction unit creates shot card data including title information about the video data on the basis of the electronic mark data.

Preferably, the extraction unit creates shot card data including title information about the video data on the basis of the electronic shot mark data written in advance to the video content data.

Preferably, the extraction unit extracts video data having a predetermined time lag before and after those video data in the video content data to which the electronic shot mark data have been written.

Preferably, the extraction unit creates edit information data based on the shot card data and on the video content data.

According to a second aspect of the invention, there is provided a recording apparatus for recording to a recording medium video content data to be supplied to an editor terminal apparatus which displays the supplied video content data, the recording apparatus including: a recording unit for writing to the video content data both electronic mark data associated with the video content data and the electronic shot mark data corresponding to the electronic mark data on a one-to-one correspondence basis.

Preferably, the recording unit writes the video content data, the electronic mark data, and the electronic shot mark data substantially in real time.

Preferably, the recording unit writes the electronic mark data to a helical track on the recording medium and the electronic shot mark data to a time code track formed longitudinally on the recording medium.

Preferably, the above recording apparatus further includes a mark table for allowing the electronic shot mark data to correspond on a one-to-one basis to the electronic mark data associated with the video content data.

According to a third aspect of the invention, there is provided a recording medium to which to record video content data to be edited on an editor terminal apparatus which displays the video content data; wherein electronic mark data associated with the video content data and electronic shot mark data corresponding to the electronic mark data on a one-to-one basis are recorded to the recording medium.

According to a fourth aspect of the invention, there is provided an editor terminal apparatus for displaying video content data recorded on a recording medium, the editor terminal apparatus including: a mark table for converting electronic mark data associated with the video content data into electronic shot mark data on a one-to-one correspondence basis; and an extraction unit for extracting video data based on the electronic shot mark data written to the video content data.

Preferably, the extraction unit creates shot card data including title information about the video data on the basis of the electronic shot mark data written in advance to the video content data.

Preferably, the extraction unit extracts video data having a predetermined time lag before and after those video data in the video content data to which the electronic shot mark data have been written.

Preferably, the extraction unit creates edit information data based on the video content data and on the shot card data.

According to a fifth aspect of the invention, there is provided a video content editing support method for use with a recording apparatus for recording captured video content data to a recording medium, and an editor terminal apparatus for displaying the video content data supplied from the recording apparatus, the method including the steps of: converting electronic mark data associated with the video content data into electronic shot mark data on a one-to-one correspondence basis; writing the electronic mark data and the electronic shot mark data to the video content data; and extracting video data based on the electronic shot mark data written to the video content data.

Preferably, in the writing step, the video content data, the electronic mark data, and the electronic shot mark data are written substantially in real time.

Preferably, the above video content editing support method further includes the step of creating shot card data including title information about the video data on the basis of the electronic mark data.

Preferably, the above video content editing support method further includes the step of creating shot card data including title information about the video data on the basis of the electronic shot mark data written in advance to the video content data.

Preferably, in the extracting step, video data, having a predetermined time lag before and after those video data in the video content data to which the electronic shot mark data have been written, is extracted.

Preferably, the above video content editing support method further includes the step of creating edit information data based on the shot card data and on the video content data.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic block diagram outlining a typical configuration of a video content editing support system embodying the invention;

FIG. 3 is a block diagram indicating a typical structure of a recording apparatus as part of the video content editing support system;

FIG. 4A is an explanatory view showing a typical structure of a recording medium for use with the video content editing support system;

FIG. 5 is an explanatory view depicting a typical structure of an AUX signal field used by the video content editing support system;

FIG. 10 is an explanatory view depicting a typical structure of another mark table used by the video content editing support system;

DESCRIPTION OF THE PREFERRED EMBODIMENTS

Figure 2:
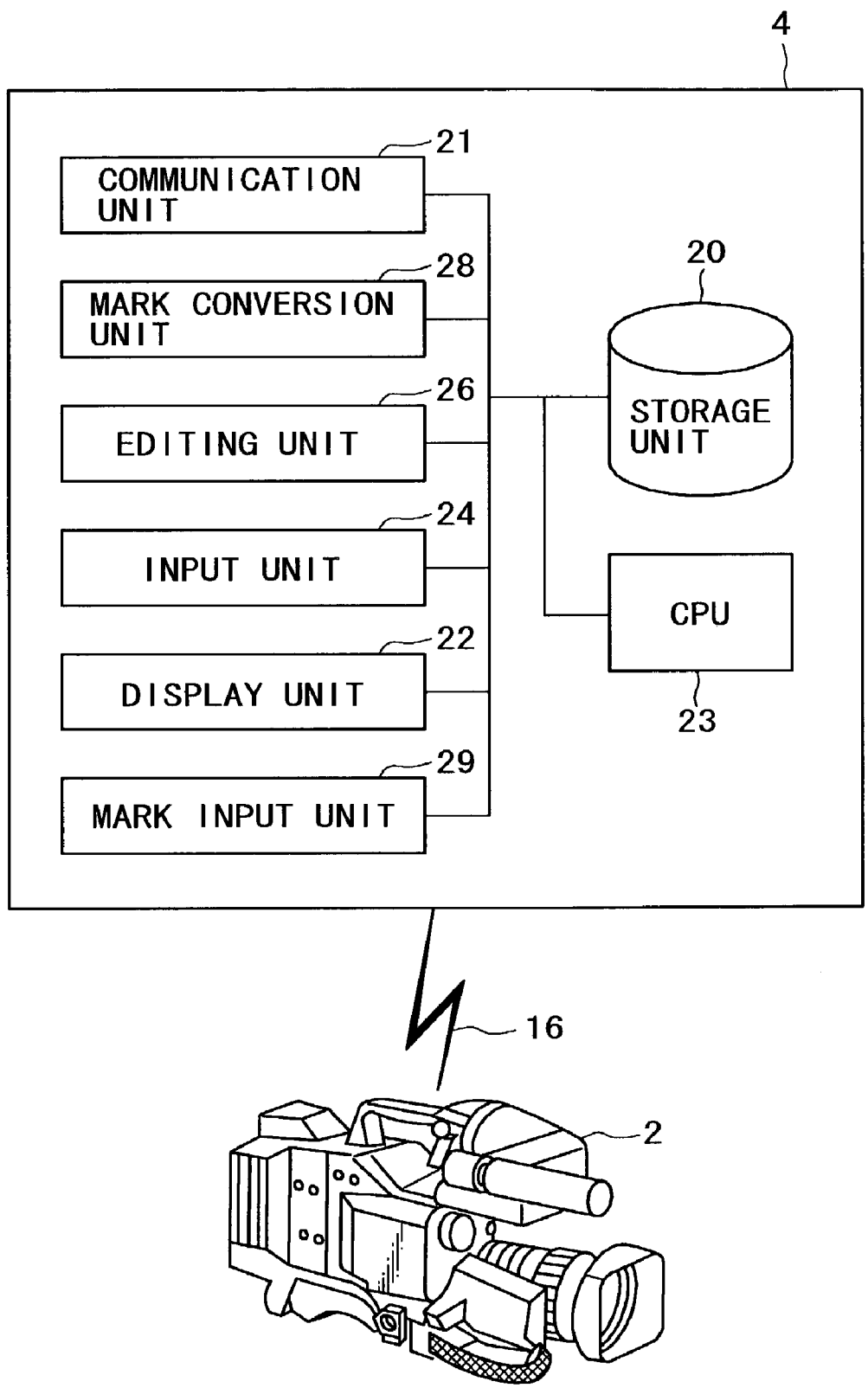
FIG. 2 is a schematic block diagram delineating a typical structure of an editor terminal apparatus as part of the video content editing support system.

Preferred embodiments of this invention will now be described in detail with reference to the accompanying drawings. In the ensuing description and in the drawings, the component parts having the same or substantially equivalent functions and structures will be designated by like reference numerals, and their descriptions will be omitted where redundant.

(1. System Configuration)

A typical configuration of a video content editing support system according to the invention will now be described with reference to FIGS. 1, 2 and 3. FIG. 1 is a block diagram outlining how the video content editing support system embodying the invention is typically configured. FIG. 2 is a block diagram delineating schematically a typical structure of an editor terminal apparatus 4 as part of the video content editing support system. FIG. 3 is a block diagram indicating a typical structure of a recording apparatus 2 as another part of the video content editing support system.

As shown in FIG. 1, the video content editing support system has the recording apparatus 2 such as a video camera and the editor terminal apparatus 4 interconnected via a network 16. The editor terminal apparatus 4 comprises at least one of a portable computer 6, a mobile telephone 8, and a mobile terminal 10.

The recording apparatus 2 need not be limited to a single unit. A plurality of units making up the recording apparatus 2 may be connected via the network 16 to a plurality of units of the editor terminal apparatus 4 on a peer-to-peer basis.

A server, not shown, may be furnished interposingly between the recording apparatus 2 and the editor terminal apparatus 4. This setup constitutes a client/server network in which the recording apparatus 2 and editor terminal apparatus 4 act as clients.

The recording apparatus 2 is typically a video camera such as a camcorder. This apparatus is used to record picture materials in the coverage of broadcast news programs, sports matches, and other events as well as in the filming of movies and shows.

When a recording medium 14 is loaded into the recording apparatus 2 as depicted in FIG. 1, the apparatus 2 may be operated illustratively in the field to record video content data onto the loaded medium 14. The recording medium 14 is illustratively a magnetic tape such as a digital VTR format video tape for D10 use. Alternatively, the recording medium 14 may be an optical disc, a magnetic disc, a hard disc, or other suitable recording medium.

After raw video materials (i.e., video content data) have been recorded illustratively at the site of coverage to the recording medium 14 such as a magnetic tape loaded in the recording apparatus 2, the recorded video content data may be reproduced by the apparatus 2.

Video content data are composed of still picture data such as photos and paintings, moving picture data such as movies and dramas, audio data such as radio programs, or any combination of these data. The video content data used by this embodiment are computer-readable digital data. Alternatively, the video content data may be analog data.

One video content data item is made up of one or a plurality of video scenes. One video scene is composed of one or a plurality of video frames (i.e., at least one video frame constitutes one video scene).

The rough editing process typically proceeds as follows: from one or a plurality of video scenes constituting the captured video content data, those scenes (called cuts) deemed usable in the final editing process are selected in a so-called logging process. Each of the selected video scenes is provided with an edit start point (in-point) and an edit end point (out-point) so that the necessary scenes may later be extracted in the final editing. The rough editing is followed by the final editing process in which complete package data to be eventually broadcast as a program are created.

Conventionally, the complete package data are created as follows: the recording medium 14 with video content data (raw material data) recorded thereon is subjected to data reproduction from the beginning. During the reproduction, an edit start point (an in-point) and an edit end point (an out-point) identifying each of the video scenes judged usable are ascertained manually based on the time codes (to be described later in detail) recorded on the recording medium 14. The points thus determined are recorded illustratively on sheets of paper.

The editor terminal apparatus 4 receives video content data from the recording apparatus 2 over the network 16 in real time, and displays the received data on a suitable display unit. That is, the editor at the apparatus 4 in a different location from the field can check the same content being picked up by the cameraman on site. The transmitted video content data may be stored in a storage unit.

The network 16 is typically a wireless network based on IEEE802.11b standards or like criteria or a wired network such as an RS-232C arrangement. It is also possible to set up the network 16 using satellite links, optical fiber cables or other appropriate wired or wireless communication means.

(1.1 Electronic Mark Data)

Described below is what characterizes the electronic mark data for use with this embodiment.

Electronic mark data refer to a set of data called meta-data composed of information which is written to video content data made of video and/or audio data and which is associated with the video content data being picked up.

The electronic mark data are transmitted over the network 16 illustratively through SDI (Serial Digital Interface) in accordance with SMPTE (Society of Motion Picture and Television Engineers) standards.

As such, the electronic mark data are meta-data that represent in text form the characteristics of at least one video scene constituting the video content data or the characteristics of the images taken at crucial moments. Written where appropriate to the video content data, the electronic mark data are used as title information (index) during the search for relevant content data.

It is possible to write the electronic mark data to each of the video frames making up the video content data. Although each item of electronic mark data used by this embodiment is made up of a maximum of 32 alphanumeric characters, this is not limitative of the invention. Alternatively, any number of characters regardless of their fonts may be used in text form. Illustratively, as many as 100 katakana characters may be used to write an electronic mark data item.

On the recording apparatus 2, electronic mark data are recorded along with video content data to suitable locations on a helical track of the recording medium 14 such as a magnetic tape. The helical track on the recording medium 14 will be described later in detail.

Electronic shot mark data are meta-data that represent electronic mark data on a one-to-one correspondence basis when the electronic mark data are written to video content data. Specifically, each item of electronic mark data, when generated, is converted to one item of previously registered electronic shot mark data.

The electronic mark data are converted by the editor terminal apparatus 4 or recording apparatus 2 into electronic shot mark data on a one-to-one correspondence basis. The recording apparatus 2 writes electronic shot mark data to a time code track formed longitudinally on the recording medium 14 in synchronism with video frame data.

The electronic mark data or electronic shot mark data written to the video content data may then be used as indices for data search in the rough editing process. This makes it possible to search rapidly for desired video scenes composed of video and/or audio data.

Furthermore, a recording/reproducing apparatus (e.g., VTR) may be used to select efficiently from the video content data those video scenes deemed necessary in advance of the final editing. In particular, as with time code data indicating tape positions, the electronic shot mark data may be detected at a variable speed faster than in the normal reproduction process in which video content data are viewed normally.

(1.2 Helical Track on the Recording Medium 14)

Figure 4B:
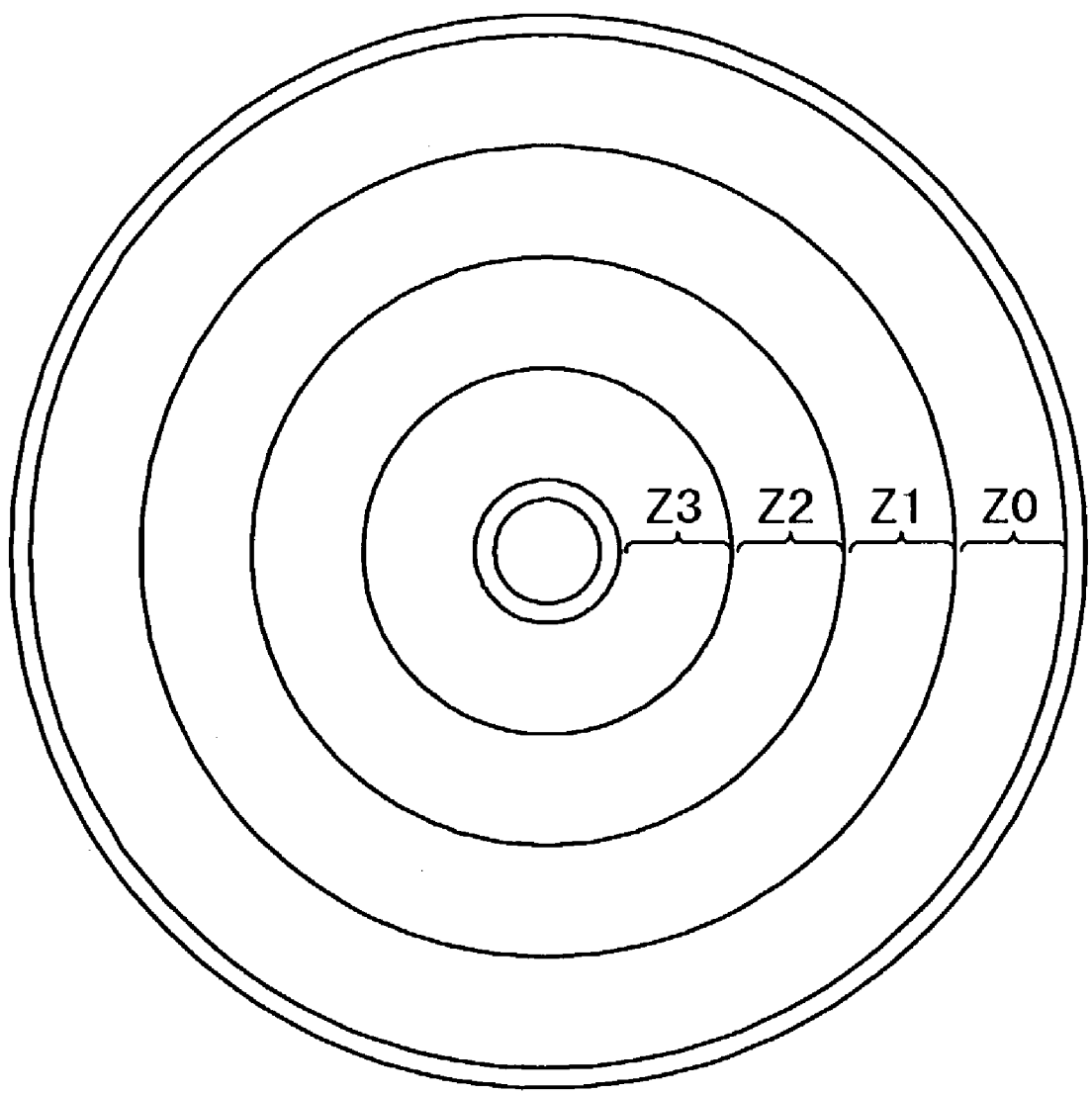
FIG. 4B is another explanatory view showing a typical structure of another recording medium for use with the video content editing support system.

Described below with reference to FIGS. 4A and 4B is the recording medium 14 to which electronic mark data are recorded by the recording apparatus 2. FIGS. 4A and 4B are explanatory views showing typical structures of recording media embodying this invention.

As shown in FIG. 4A, the recording medium 14 comprises a helical track 82, a control track CTL, and a time code track TC. The helical track 82 is formed on the recording medium 14 by helical scan in the direction of movement of a rotary head unit 37. The control track CTL is formed longitudinally along the recording medium 14 that is a magnetic tape. The time code track TC provides a time base in synchronism with video content data.

The helical track 82 is standardized illustratively in keeping with SMPTE criteria. One frame of video data is recorded to a set of as many as 10 or 12 helical tracks.

The helical track 82 is made up of a video signal field 80, an audio signal field 81, and an AUX (auxiliary) signal field 83. A video data signal is recorded to the video signal field 80 and an audio data signal to the audio signal field 81. The audio and video signals may be recorded in analog format and may be compressed illustratively according to MPEG-2 standards. As mentioned earlier, the recording medium 14 is not limited to the magnetic tape. Alternatively, the recording medium 14 may be an optical disc such as one shown in FIG. 4B to which electronic mark data and other data may be recorded. The optical disc may be formatted to have a plurality of zones in the radial direction (four zones Z0 through Z3 in this example). Each of the zones is formed by a plurality of tracks.

Below is a description of the AUX signal field 83 with reference to FIG. 5. FIG. 5 is an explanatory view depicting a typical structure of the AUX signal field 83.

As shown in FIG. 5, the AUX signal field 83 has a format comprising a header part, a system part of five bytes, a user data part of 104 bytes, a reserved part of 35 bytes, and a parity part of 12 bytes.

Figures 6, 7:
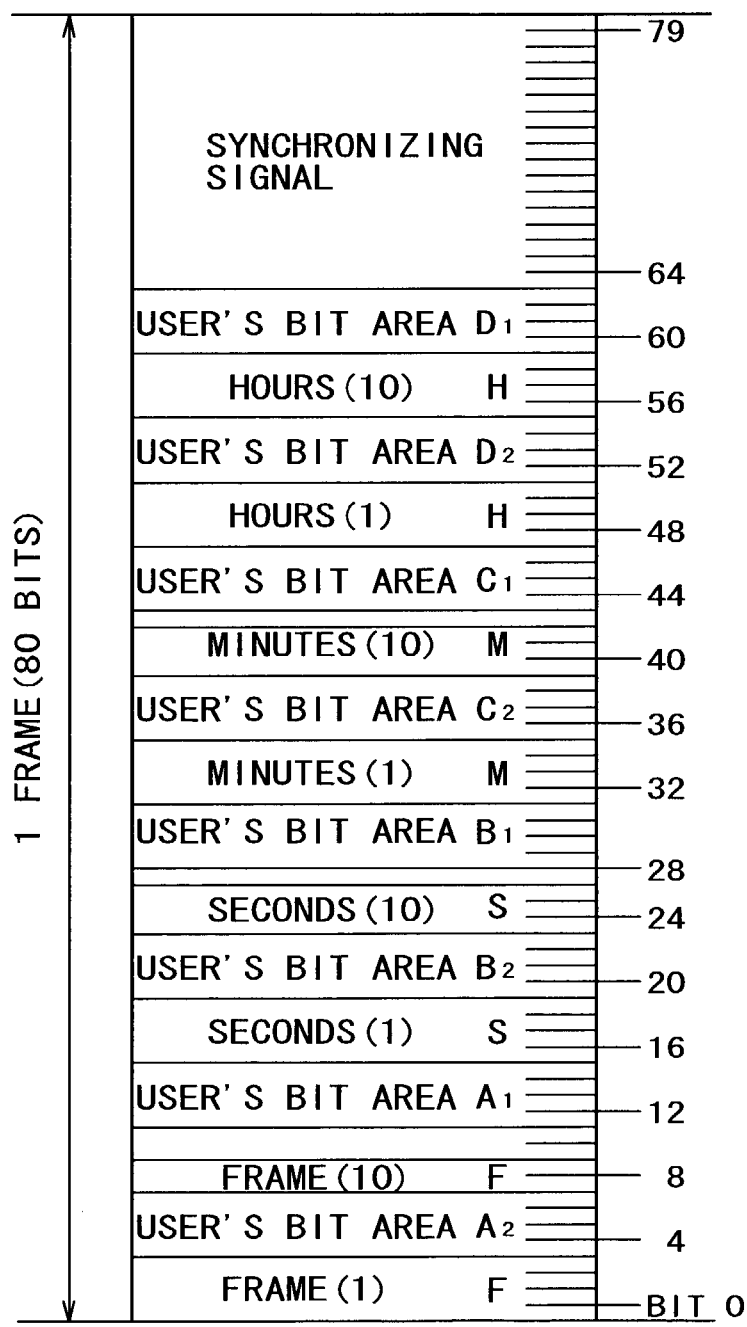
FIG. 6 is an explanatory view illustrating a typical format of a user data part used by the video content editing support system.
FIG. 7 is an explanatory view indicating a typical format of a time code recorded to a time code track of the video content editing support system.

The user data part will now be described in more detail with reference to FIG. 6. FIG. 6 is an explanatory view illustrating how the user data part is formatted.

As shown in FIG. 6, the user data part of 104 bytes is formatted into two portions: a header portion, and an electronic mark portion. The electronic mark portion accommodates electronic mark data constituted by text data.

The electronic mark data are written to the user data part in the AUX signal field 83 of the helical track 82 formed on the recording medium 14.

(1.3 Time Code)

The time code will now be described with reference to FIGS. 4A, 4B and 7. FIG. 7 is an explanatory view indicating a typical format of a time code recorded to the time code track TC.

The time code indicates time-based positions synchronized with video frames making up video scenes. Time code data are written to the time code (longitudinal time code) track TC shown in FIG. 4A with regard to each frame.

Specifically, as depicted in FIG. 7, the time code data are recorded to the time code track TC for each frame made up of 80 bits. A single frame comprises: a synchronizing signal area for recording a synchronizing signal; eight time code recording bit areas in which to record time code data representative of hours (HH), minutes (MM), seconds (SS), and frames (FF); and eight user's bit recording areas in which to record user's bits (D1D2; C1C2; B1B2; A1A2).

As shown in FIG. 7, hour (HH) information in the time code is written to two bit areas (H, H), one made of bits 48-51 and the other with bits 56-59. Likewise, minute (MM) information is written to two bit areas (M, M), i.e., bits 32-35 and bits 40-42; second (SS) information is written to two bit areas (S, S), i.e., bits 16-19 and bits 24-26; and frame (FF) information is written to two bit areas (F, F), i.e., bits 0-3 and bits 8-9.

(1.3.1 Electronic Shot Mark Data Recorded to the Time Code Track)

Below is a description of the time code track TC to which electronic shot mark data are written.

As shown in FIG. 7, electronic shot mark data are written to bit areas C1 and C2 (bits 44-47, bits 36-39), which are two of the eight user's bit recording area.

The electronic shot mark data are converted from electronic mark data on a one-to-one correspondence basis. Illustratively, if electronic mark data "REC START" are written to video content data, then a mark table is used to convert the data into unique electronic shot mark data in the form of an electronic shot mark TD code of, say, "20 h" in hexadecimal notation.

(2. Structures of Components Making up the Video Content Editing Support System)

Described below with reference to FIGS. 1, 2 and 3 is how the components constituting the inventive video content editing support system are individually structured.

(2.1 Network 16)

The network 16 interconnects the recording apparatus 2 and the editor terminal apparatus 4 in a bidirectionally communicable manner. Although this embodiment adopts a wireless communication setup illustratively based on IEEE802.11b standards, this is not limitative of the invention. Alternatively, the network 16 may be a wired network such as an RS-232C arrangement or may be implemented using satellite links, optical fiber cables for optical data communication, or other appropriate communication means.

(2.2 Editor Terminal Apparatus 4)

The editor terminal apparatus 4 is an information processing apparatus generally composed of a computer that includes at least a central processing unit, a communication unit, and a storage unit. As shown in FIG. 1, the editor terminal apparatus 4 may typically include a laptop type portable computer 6, a mobile telephone 8, and/or a mobile data terminal 10 represented by a PDA (Personal Digital (Data) Assistant).

The editor terminal apparatus 4 is capable of displaying video content data being sent from the recording apparatus 2 in real time. It is also possible for the editor terminal apparatus 4 to write via the network 16 electronic mark data and electronic shot mark data to video content data being picked up by the recording apparatus 2 or to edit otherwise the concurrently captured video content data.

As shown in FIG. 2, the editor terminal apparatus 4 comprises: a CPU (central processing unit) 23 offering arithmetic functions; a storage unit 20 with a recording medium for storing video content data and other data; a communication unit 21 for sending and receiving video content data and other data to and from the recording apparatus 2 over the network 16; a display unit 22 for displaying video content data and other data; an input unit 24; an editing unit 26 for editing electronic mark data or video content data; a mark input unit 29 for writing electronic mark data; and a mark conversion unit 28 for converting electronic mark data to electronic shot mark data on a one-to-one correspondence basis.

The communication unit 21 sends and receives over the network 16 such data as video content data, electronic mark data, and electronic shot mark data to and from the recording apparatus 2. The communication unit 21 also has functions such as a video capture capability for use in receiving video content data.

The input unit 24 is made up of buttons, control levers, a keyboard, and/or a mouse. Illustratively, the keyboard or similar means is used to input characters in text form, or the mouse or levers are operated to manipulate a display screen on the display unit 22.

(2.2.1 Mark Conversion Unit 28)

The mark conversion unit 28 contains a mark table that uniquely identifies the electronic mark data generated by the mark input unit 29. The electronic mark data, when received, are converted to the corresponding electronic shot mark data through the mark table. Depending on the subject to be picked up, a variety of mark tables may be stored in the mark conversion unit 28.

(2.2.1.1 Mark Table)

The mark table will now be described with reference to FIGS. 8 and 9. These two drawings are explanatory views depicting typical structures of mark tables used by this embodiment.

Various mark tables may be prepared depending on the subject and situation for image pickup. A mark table 900 shown in FIG. 8 is composed of electronic mark data 902 and electronic shot mark data 904.

The mark table 900 of this embodiment is used to convert into electronic shot mark data those electronic mark data written while a baseball match is being filmed.

Figure 8:
FIG. 8 is an explanatory view sketching a typical structure of a mark table used by the video content editing support system.

For example, a video scene in which the pitcher throws the ball may be given an electronic mark "PITCH." In that case, the electronic mark "PITCH" in the electronic mark data 902 is converted to an electronic shot mark "21 h" (in hexadecimal notation) in the electronic shot mark data 904 on a one-to-one correspondence basis, as illustrated in FIG. 8.

Figure 9:
FIG. 9 is an explanatory view showing a typical structure of another mark table used by the video content editing support system.

A mark table 1000 shown in FIG. 9 is made up of electronic mark data 1002 and electronic shot mark data 1004. The mark table 1000 of this embodiment is used to convert into electronic shot mark data those electronic mark data written while a movie is being filmed.

For example, in a scene in which a number of performers make their appearance, the camera may first film the entire cast and then zoom in on two protagonists in what may be called a zoom-up operation. That scene may then be given an electronic mark "ZOOM UP."

The electronic mark "ZOOM-UP" in the electronic mark data 1002 is converted to an electronic shot mark "22 h" (in hexadecimal notation) in the electronic shot mark data 1004 on a one-to-one correspondence basis, as shown in FIG. 9.

Predetermined hexadecimal electronic shot mark data are written to the time code track TC on the recording medium 14. It should be noted that the predetermined hexadecimal values used by this embodiment as electronic shot mark data in the mark tables are not limitative of the invention. Any other suitable values may be set and used instead.

The mark input unit 29 is an input device that has one or a plurality of buttons for use in writing electronic mark data. Depending on the button or buttons operated, the mark input unit 29 generates electronic mark data out of text data stored beforehand in a mark table. Illustratively, the mark input unit 29 may be equipped with an audio input terminal to which to connect an external microphone, not shown. An audio command entered through the connected microphone may cause desired electronic mark data to be generated from predetermined data in the mark table.

Although the mark input unit 29 for this embodiment is a button-operated type, this is not limitative of the invention. Any other suitable types of input unit may be employed, including one with a dial that is rotated to select desired electronic marked data.

(2.3 Recording Apparatus 2)

The recording apparatus 2 will now be described with reference to FIG. 3. FIG. 3 is a block diagram indicating a typical structure of the recording apparatus 2 as part of the video content editing support system embodying the invention.

The recording apparatus 2 is made up of a camera device and a VTR (video tape recorder) integrally combined. As such, the recording apparatus 2 is capable of taking pictures of the subject as video content data, recording the picked-up video content data to the recording medium 14, and reproducing the recorded video content data from the medium 14.

As shown in FIG. 3, the recording apparatus 2 comprises: a recording/reproduction block for recording and reproducing video and audio data; a communication unit 75 for exchanging data with an external entity such as the editor terminal apparatus 4; a control unit 76; a mark setting block for writing electronic mark data and electronic shot mark data; and a mark extraction block for extracting electronic mark data and electronic shot mark data.

The control unit 76 has a storage function for storing electronic mark data and other data. The control unit 76 is connected to a fixed head 55, a rotary head unit 37, a CPU 67, a recording unit 54, and an operation control unit 33. Through these connections, the control unit 76 controls the data or signals sent to or received from the connected components.

The recording/reproduction block includes: a digital signal recording unit 71, a digital signal reproduction unit 72, an analog audio signal recording unit 73, an analog audio signal generation unit 74, fixed heads 55 and 38 for recording and reproducing a time code data signal representative of time codes, a capstan motor 35, a drum motor 36, a rotary head unit 37 for recording and reproducing video and audio data signals, and a motor control unit 34.

The recording/reproduction block takes video content data made up of images and sounds picked up from the subject, converts the video content data into video and audio data signals, and records or reproduces the video and audio data signals. An electronic mark data signal and an electronic shot mark data signal converted from the electronic mark data signal are written to the recording medium 14 through the recording/reproduction block.

An operation switch unit 32, another component of the recording/reproduction block, is connected to the operation control unit 33. The operation switch unit 32 is used to set operation modes such as recording or reproduction mode in which power is applied to the recording apparatus 2. Given an operation mode signal CT from the operation switch unit 32, the operation control unit 33 generates a motor control signal MC and a mode signal MS accordingly. The operation control unit 33 is also connected to the control unit 76 and sends and receives the operation mode signal CT to and from the control unit 76.

The motor control signal MC is sent to the motor control unit 34. The mode signal MS is transferred to the recording unit 54, reproduction unit 61, digital signal recording unit 71, digital signal reproduction unit 72, analog audio signal recording unit 73, analog audio signal generation unit 74, and a monostable multivibrator 47.

Upon receipt of the motor control signal MC, the motor control unit 34 generates a motor driving signal MD accordingly. Sending the motor driving signal MD to the capstan motor 35 and drum motor 36 causes the recording medium 14 (i.e., magnetic tape) to run and the rotary head unit 37 having multiple heads to rotate.

The rotary head unit 37 in operation writes electronic mark data to the video content data being picked up, so that both the electronic mark data and the video content data are recorded to the recording medium 14.

The mark setting block includes: a setting switch unit 40, a data signal generation unit 41, a time code data holding unit 42, a user data holding unit 43, a recording start data holding unit 78, an electronic mark text data holding unit 45, monostable multivibrators 51 and 47, signal changeover switches 49 and 77, a marker button 50, a signal modulation unit 53, a recording unit 54, a mark conversion unit 48 for converting electronic mark data into electronic shot mark data, and a marker input unit 79.

The mark setting block generates time code data, i.e., time information for providing synchronism with video content data to be recorded on the recording medium 14. An input operation on the marker button 50 or marker input unit 79 causes electronic mark data to be generated.

The setting switch unit 40 is used to determine whether or not to record such information as recording time, the type of text data to be set in electronic mark data, and GPS (Global Positioning System) information including the position, compass bearing, and altitude of the location where filming takes place. The resulting setting signal SS is transferred to the data signal generation unit 41 acting as pattern generation means.

Given the setting signal SS from the setting switch unit 40, the data signal generation unit 41 generates time code data DT, user data DU, recording start mark data DC, and electronic mark data DM accordingly. The time code data DT generated by the data signal generation unit 41 are held by the time code data holding unit 42 while being sent to the signal modulation unit 53 as well.

The user data DU are held by the user data holding unit 43 and are also transferred to a terminal "a" of the signal changeover switch 49. The electronic mark data DM, while being held by the electronic mark data holding unit 45, are also sent to a terminal "b" of the signal changeover switch 77. The recording start mark data DC are held by the recording start data holding unit 78 and are transmitted to a terminal "a" of the signal changeover switch 77 concurrently.

The marker button 50 is operated so as to write (i.e., record) electronic mark data. The marker button 50 comprises one or a plurality of buttons. For example, when a good scene is being filmed, a "GOOD SHOT" button is pushed to record an electronic mark "GOOD SHOT"; when recording is started, a "REC START" button is operated to write an electronic mark "REC START." The makeup of the marker button 50 may be varied depending on the subject to be filmed and the purpose of the coverage.

Alternatively, the marker button 50 may be implemented so that pushing it once writes to video content data an electronic mark "HIGHLIGHT" indicating the start of a particular scene, and that pushing the button twice writes an electronic mark "GOOD SHOT" to the video content data.

As described above, the marker button 50 is an input device operated to write (i.e., record) electronic mark data to video content data. An input from the marker button 50 generates an operation signal SG that is sent to the monostable multivibrator 51. In turn, the monostable multivibrator 51 transmits a High-level mark signal GW to the signal changeover switch 77 and to an OR circuit 52. The signal changeover switch 77 has its movable terminals thus controlled by the mark signal GW.

When recording mode is started based on the mode signal MS, the monostable multivibrator 47 generates a High-level mode timing signal MT for a predetermined period of time. The mode timing signal MT is transferred to the OR circuit 52.

The OR circuit 52 sends a signal MR to the signal changeover switch 49. In turn, the signal changeover switch 49 has its movable terminals controlled by the signal MR.

The signal modulation unit 53 updates the time code data DT coming from the time code data holding unit 42. The time code data DT thus updated are modulated together with the data selected by the signal changeover switch 49 to become a write data signal WT. The write data signal WT is transferred to the recording unit 54.

The recording unit 54 coverts into write data signal WS the write data signal WT having been transferred. Based on the mode signal MS from the operation control unit 33, the recording unit 54 sends the write data signal WS to the fixed head 55 and to the rotary head unit 37. In addition, the recording unit 54 sends to the control unit 76 the write data signal WS to be forwarded to the editor terminal apparatus 4.

The recording unit 54 converts into the write data signal WS both the write data signal WT including electronic mark data and the write data signal WT including electronic shot mark data converted by the mark conversion unit 48. The resulting write data signal WS is sent to the fixed head 55, rotary head unit 37, and control unit 76.

Upon receipt of the write data signal WS, the rotary head unit 37 writes the electronic mark data to the video content data. The rotary head 37 further records the video content data having the electronic mark data written therein to the recording medium 14.

On receiving the write data signal WS, the fixed head 55 records the time code data and electronic shot mark data to the recording medium 14 in such a manner as to ensure synchronism with the video content data having the electronic mark data written therein.

(2.3.1 Mark Conversion Unit 48)

The mark conversion unit 48 converts the electronic mark data included in the received write data signal WS into electronic shot mark data. The mark conversion unit 48 sends to the recording unit 54 the write signal data WS to which both the electronic shot mark data following the conversion and the unconverted electronic mark data are attached.

The mark conversion unit 48 retains one or a plurality of mark tables for uniquely identifying electronic shot mark data. With a suitable mark table in use, the electronic shot mark data are converted from the electronic mark data on a one-to-one correspondence basis.

(2.3.1.1 Mark Tables)

The mark table used by the recording apparatus 2 will now be described with reference to FIG. 10. FIG. 10 is an explanatory view depicting a typical structure of a mark table 800 for use with the video content editing support system embodying the invention.

The mark table 800 in FIG. 10 is made up of electronic mark data 802 and electronic shot mark data 804. This mark table 800 is used to convert electronic mark data into electronic shot mark data when the electronic mark data are written by the recording apparatus 2.

Thus if an electronic mark "REC START" is included in the write data signal WS, then an electronic shot mark "20 h"

(in hexadecimal notation) in the electronic shot mark data 804 is uniquely selected to represent the electronic mark "REC START" in the electronic mark data 802, as shown in FIG. 10.

The mark extraction block includes: a reproduction unit 61, a data separation unit 62, a data holding unit 63, a user area data holding unit 64, a comparison pattern generation unit 66, a pattern comparison unit 65, a CPU 67, a display unit 68, and a selection setting switch 69.

The mark extraction block first reproduces video content data from the recording medium 14. From the reproduced video content data, the mark extraction block extracts electronic mark data or electronic shot mark data written therein.

The reproduction unit 61 is connected to the fixed head 55 and rotary head unit 37 which reproduce the video and audio data signals extracted from video content data. A reproduced signal RS from the fixed head 55 is converted to a reproduced video content data signal RT that is sent to the data separation unit 62.

In the event of variable speed reproduction (i.e., fast forward) faster than in normal reproduction for the ordinary viewing of video content data, the reproduction unit 61 receives the reproduced signal RS, converts it to a reproduced video content data signal RT composed of electronic shot mark data and time code data indicating tape positions, and outputs the converted signal RT.

That is, during variable speed data reproduction, the electronic shot mark data signal and time code data signal are first extracted by the fixed head 55. The reproduction unit 61 converts the extracted signals into a reproduced video content data signal RT and sends the converted signal RT to the data separation unit 62.

Given the reproduced video content data signal RT, the data separation unit 62 separates the signal RT into video content data DT and user's bit area data DE that are constituted by the user's bits shown in FIG. 7.

After the separation, the video content data DT are transferred to the data holding unit 63 and held there until the next video content data DT are sent in. The video content data DT thus retained in the data holding unit 63 are forwarded from there to the CPU 67.

The user's bit area data DE are held by the user area data holding unit 64. The data DE thus retained in the user area data holding unit 64 are sent from there to both the pattern comparison unit 65 and the CPU 67.

The display unit 68 is typically constituted by a liquid crystal display (LCD) and provides displays of electronic mark data, electronic shot mark data, time code data, and video content data.

The pattern comparison unit 65, connected to the comparison pattern generation unit 66, compares an electronic shot mark data signal or electronic mark data DM generated by the comparison pattern generation unit 66, with user's bit area data DE transmitted from the user area data holding unit 64. A comparison signal CC resulting from the comparison is sent from the pattern comparison unit 65 to the CPU 67.

The CPU 67 receives the comparison signal CC from the pattern comparison unit 65 and, if the signal CC indicates a match, extracts the matched electronic shot mark data signal or electronic mark data DM and stores what is extracted into a RAM. The stored electronic shot mark data signal or electronic mark data DM are sent from the CPU 67 to the display unit 68 and control unit 76 along with corresponding time code data DT.

When the extracted electronic shot mark data signal or electronic mark data DM are designated, it is possible to reach the position of the image frame data in the designated video content data (in what is called a cue-up operation).

The digital signal recording unit 71 converts digital video and audio signals into a write signal. This write signal is forwarded to the rotary head unit 37 in accordance with the mode signal MS from the operation control unit 33. The rotary head unit 37 records the write signal to the recording medium 14 that is a magnetic tape in this example.

Furthermore, the digital signal recording unit 71 sends a video write signal to the control unit 76 in order to transmit video data to the editor terminal apparatus 4. The write signal thus sent is converted in a manner ready to be sent to and displayed by the editor terminal apparatus 4. The converted signal is sent from the communication unit 75 to the editor terminal apparatus 4 through SDI over the network 16.

A reproduced signal is obtained by the rotary head unit 37 reading data from the recording medium 14. The reproduced signal thus acquired is sent to the digital signal reproduction unit 72 for conversion into digital video and audio signals. After the conversion, the digital video and audio signals are transferred from the digital signal reproduction unit 72 to the reproduction unit 61 and control unit 76.

The analog audio signal recording unit 73 converts an analog audio signal to a write signal. This write signal is sent to the fixed head 38 or control unit 76 for recording based on the mode signal MS coming from the operation control unit 33. The reproduced signal acquired from the recording medium 14 or from the control unit 76 is forwarded to the analog audio signal generation unit 74 for conversion into an analog audio signal.

(3. Workings of the Video Content Editing Support System)

What follows is a description of how the video content editing support system structured as described above typically works.

(3.1 Video Content Data Recording Process by the Recording Apparatus 2)

Figure 11:
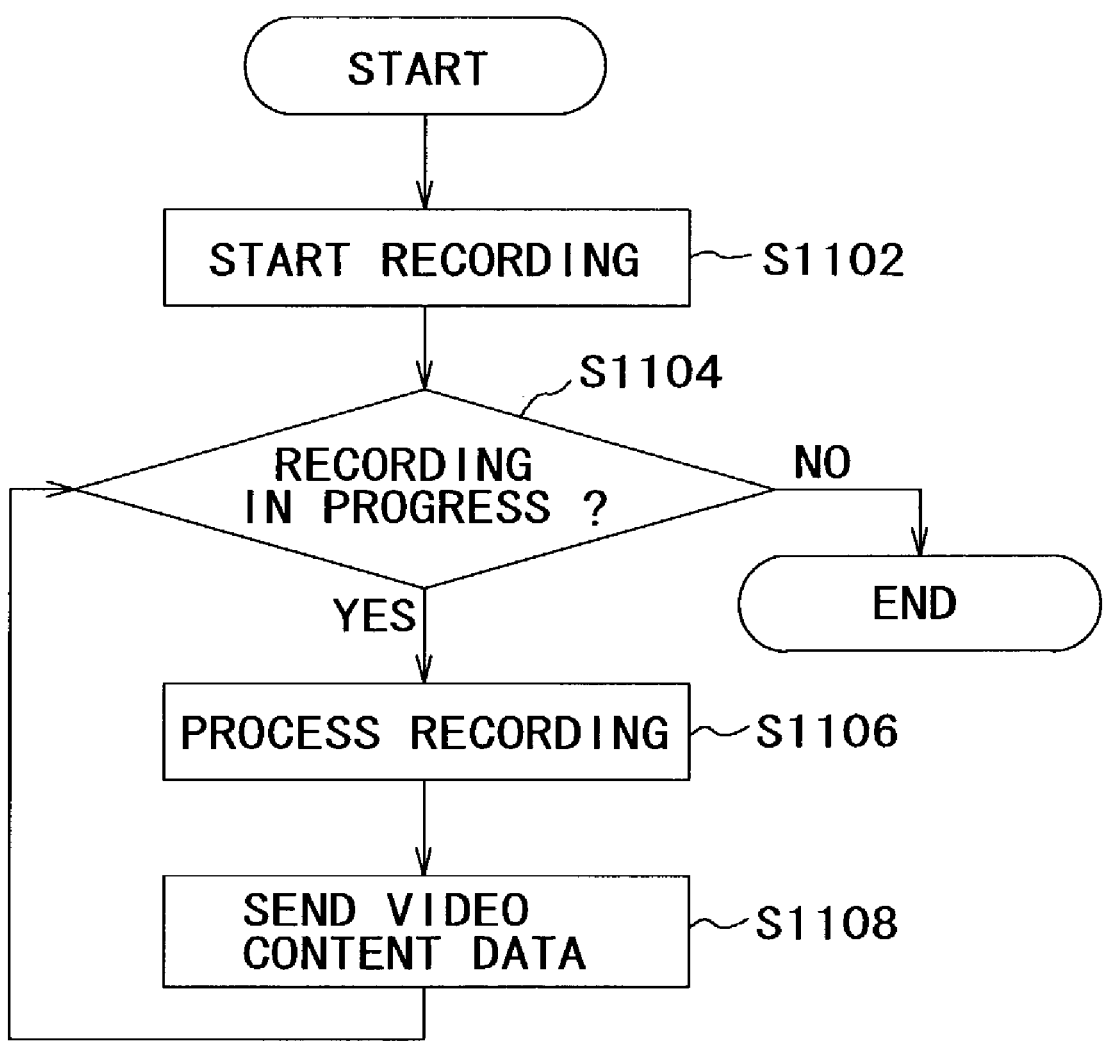
FIG. 11 is a flowchart of steps constituting a recording process performed by the recording apparatus as part of the video content editing support system.

The recording process performed by the recording apparatus 2 will now be described with reference to FIGS. 3 and 11. FIG. 11 is a flowchart of steps constituting a typical recording process performed by the recording apparatus 2 as part of the video content editing support system embodying the invention.

The recording apparatus 2 is first switched on by operation of its operation switch unit 32 before the subject is filmed. The operation control unit 33 puts the VTR (video tape recorder) into recordable status and causes the communication unit 75 to send a VTR status signal to the editor terminal apparatus 4.

Operating the setting switch 40 sets necessary data to be written to the recording medium 14. The data include the date and the time of day of recording and the recording time (time codes).

The settings above cause the data signal generation unit 41 to generate time code data DT and user data DU. The time code data DT and user data DU are held by the time code data holding unit 42 and user data holding unit 43 respectively. The time code data DT and user data DU thus retained are then output from the respective holding units 43 and 43.

When the setting switch 40 is operated selectively to write electronic mark data or recording start mark data, the data signal generation unit 41 generates the recording start mark data DC and electronic mark data DM accordingly.

The recording start mark data DC and electronic mark data DM are held by the recording start data holding unit 78 and electronic mark data holding unit 45 respectively. The recording start mark data DC and electronic mark data DM thus retained are then output from the respective holding units 78 and 45.

In step S1102 of FIG. 11, the operation switch unit 32 is operated to send a VTR status signal to the editor terminal apparatus 4, and the recording process is started. In step S1104, a check is made on the motor control signal MC from the operation control unit 33 to see whether a recording (i.e., write) state is brought about. If the recording state is judged to be in progress, then the motor control unit 34 sends a motor driving signal MD to the capstan motor 35 and drum motor 36, causing the recording medium 14 to run and the rotary head unit 37 to rotate.

While the recording state is judged to be in effect in step S1104, the operation control unit 33 outputs a mode signal MS indicating a write operation. Given the mode signal MS, the digital signal recording unit 71 transmits write signals to the rotary head unit 37. Specifically, step S1106 is reached and a digital video signal and a digital audio signal are recorded to the helical track 82 shown in FIG. 4A. In other words, the process of recording video content data in step S1106 continues as long as the recording state is judged to be in effect in step S1104.

The write signals are sent to the control unit 76 and forwarded from there to the editor terminal apparatus 4 through the communication unit 75 in step S1108. The write signals may alternatively be converted to low-resolution video content data to reduce the loads of data transmission to the editor terminal apparatus 4.

(3.2 Writing Process by the Editor Terminal Apparatus 4)

Figure 12:
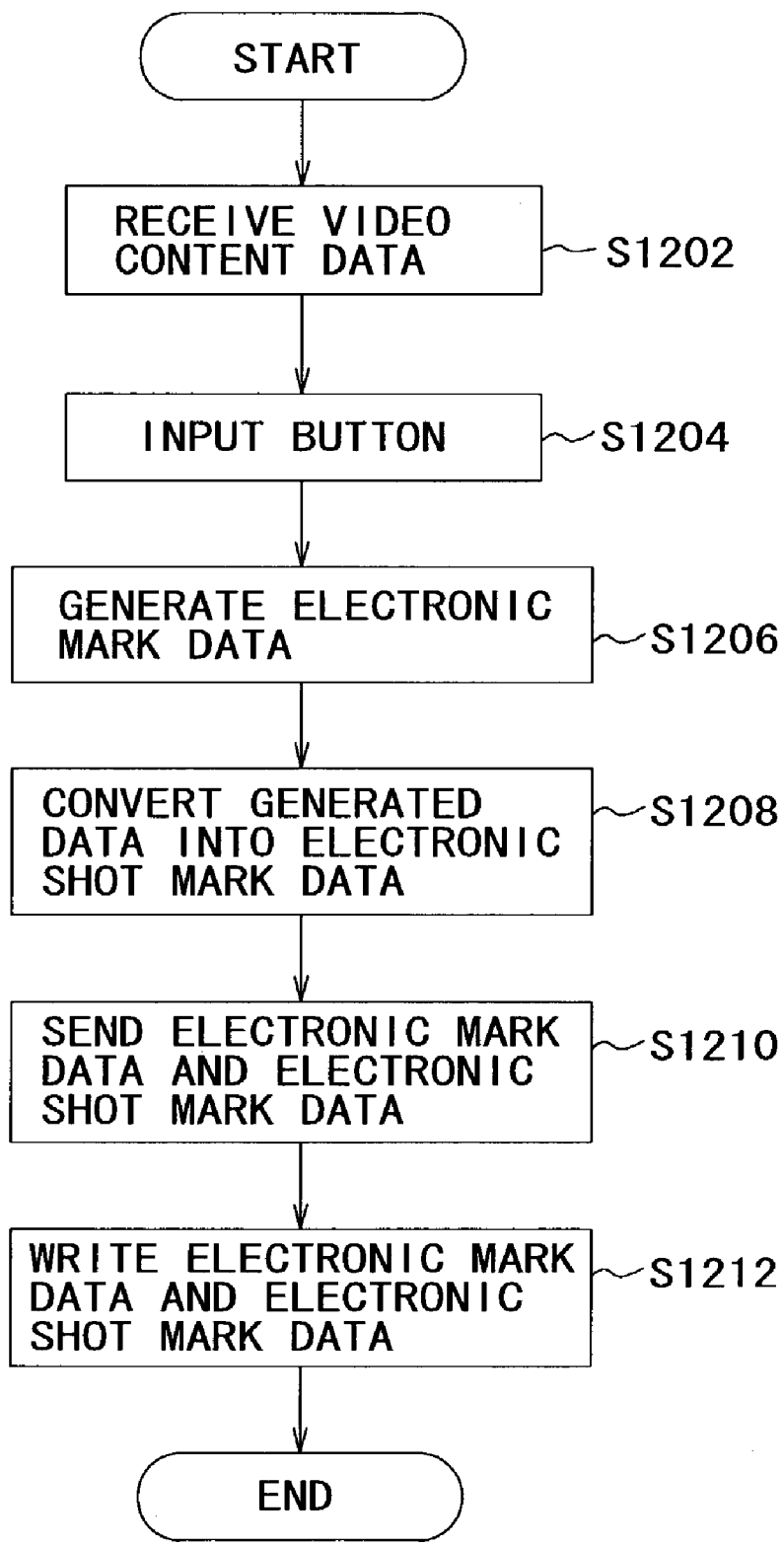
FIG. 12 is a flowchart of steps constituting the process of writing electronic mark data and electronic shot mark data, performed by the editor terminal apparatus as part of the video content editing support system.

Described below with reference to FIGS. 2, 11 and 12 is how the editor terminal apparatus 4 writes electronic mark data and electronic shot mark data. FIG. 12 is a flowchart of steps constituting a typical process of writing electronic mark data and electronic shot mark data, performed by the editor terminal apparatus 4 as part of the video content editing support system embodying the invention.

As shown in FIG. 12, before a recording process is started by the recording apparatus 2, the editor terminal apparatus 4 needs to be switched on. On the activated editor terminal apparatus 4, a medium ID for identifying the recording medium 14 is established and a necessary mark table is selected from a plurality of stored mark tables in preparation for receiving video content data.

When the recording apparatus 2 enters the recordable state as indicated by the receipt of the VTR status signal, the recording process is started in step S1106 of FIG. 11. Concurrently, in step S1202 of FIG. 12, the editor terminal apparatus 4 receives video content data from the recording apparatus 2 through the communication unit 21. The video content data thus received are displayed on the display unit 22. The display screen that appears at this point on the display unit 22 is substantially the same as a master board data display screen 1600, to be described later with reference to FIG. 17, and thus will not be described here in detail.

On the mark input unit 29 of the editor terminal apparatus 4, a suitable button is input in step S1204 so as to set previously stored electronic mark data corresponding to the current video scene. In step S1206, electronic mark data DM are generated in keeping with the input button.

Suppose that the current scene is a highlight of the video content data being recorded. In that case, a "HIGHLIGHT" button (not shown) for writing an electronic mark "HIGHLIGHT" is input. This generates the corresponding electronic mark data DM representative of the mark "HIGHLIGHT."

When the electronic mark data DM are generated, the mark conversion unit 28 coverts the generated data into an electronic shot mark data signal in step S1208. This is how the electronic shot mark data signal is generated.

The generated electronic shot mark data signal and electronic mark data DM are sent from the communication unit 21 of the editor terminal apparatus 4 to the communication unit 75 of the recording apparatus 2 through SDI over the network 16 in step S1210.

When the communication unit 75 of the recording apparatus 2 receives the electronic mark data DM and electronic mark data signal, the control unit 76 converts the received data and signal into a write data signal WT. The control unit 76 sends the write data signal WT to the recording unit 54 so that the signal WS may be written to the video content data.

On receiving the write data signal WT, the recording unit 54 converts the received signal into a write data signal WS for transmission to the fixed head 55 and rotary head unit 37.

Given the write data signal WS, the rotary head unit 37 writes the electronic mark data to the video content data and records the whole data to the recording medium 14 in step S1212. Also in step S1212, the fixed head 55 upon receipt of the write data signal WS records (i.e., writes) time code data and electronic shot mark data to the time code track TC on the recording medium 14 in synchronism with the frames of the video content data to which the electronic mark data have been written.

The process of writing the electronic mark data and electronic shot mark data to the video content data is performed continuously by the editor terminal apparatus 4 or the recording apparatus 2 in steps S1202 through S1212 as long as the recording process in step S1106 of FIG. 11 is in effect.

The network 16 may be implemented as a wireless arrangement allowing the editor terminal apparatus 4 to be physically away from the recording apparatus 2 when writing electronic mark data and electronic shot mark data. In that setup, an editor working at the editor terminal apparatus 4 may stay in an environment suitable for editing, the editor writing relevant electronic mark data and electronic shot mark data from substantially the same point of view as the camera operator handling the recording apparatus 2.

(3.3 Mark Data Writing Process by the Recording Apparatus 2)

Figure 13:
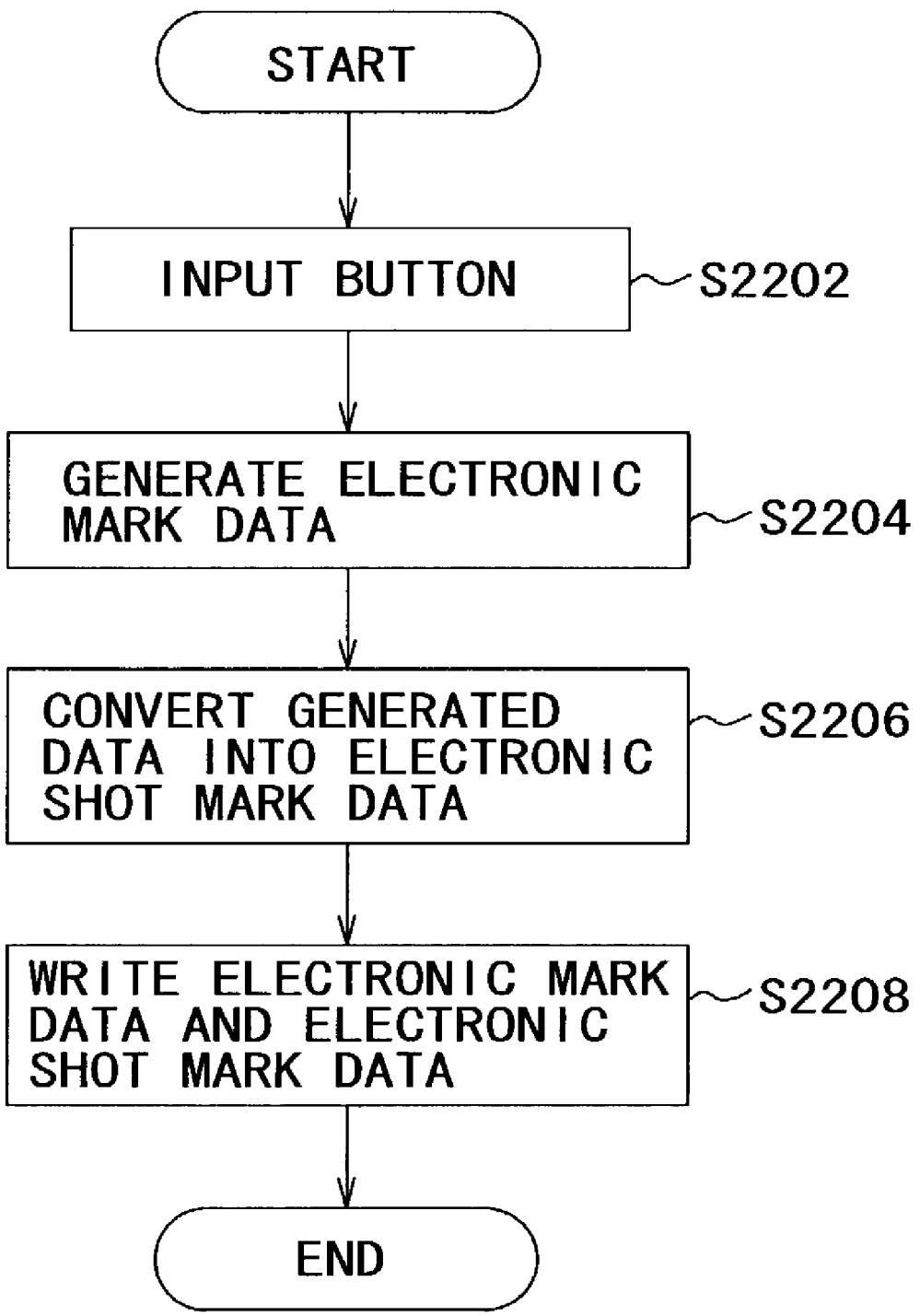
FIG. 13 is a flowchart of steps constituting the process of writing electronic mark data and electronic shot mark data, performed by the recording apparatus as part of the video content editing support system.

The process of writing electronic mark data and electronic shot mark data performed by the recording apparatus 2 will now be described with reference to FIGS. 3, 11 and 13. FIG. 13 is a flowchart of steps constituting a typical process of writing electronic mark data and electronic shot mark data, performed by the recording apparatus 2 as part of the video content editing support system embodying the invention.

Suitably operating the operation switch 32 of the recording apparatus 2 sends a VTR status signal to the editor terminal apparatus 4. The recording apparatus 2 then starts its recording process in step S1106 of FIG. 11.

While the recording is in progress in step S1106 of FIG. 11, the marker button 50 such as a "REC START" button (indicating the start of recording) or a "GOOD SHOT" button is input in step S2202 of FIG. 13. An operation signal SG is generated in keeping with the input button.

The operation control unit 33 sends a mode signal MS representing the recording operation to the monostable multivibrator 47. In turn, the monostable multivibrator 37 outputs a High-level mode timing signal MT for a predetermined period of time, causing the data signal generation unit 41 to generate recording start mark data DC and electronic mark data DM in step S2204.

The operation signal SG generated by the marker input unit 79 or marker button 50 is sent to the monostable multivibrator 51. In turn, the monostable multivibrator 51 outputs a High-level mark signal GW for a predetermined period of time, causing the signal changeover switch 77 to be positioned to its terminal "b." Because the mark signal GW remains High for the predetermined time period, the signal MR is also held High for that period, causing the signal changeover switch 49 to be positioned to its terminal "b."

As a result, the electronic mark data MD generated by operation of the marker input unit 79 or marker button 50 are transferred to the signal modulation unit 53. The electronic mark data MD and time code data DT are converted by the signal modulation unit 53 into a write data signal WT for output to the recording unit 54.

Upon receipt of the write data signal WT, the recording unit 54 detects the electronic mark data contained therein. The recording unit 54 then causes the mark conversion unit 48 to convert the electronic mark data into electronic shot mark data in step S2206.

From the mark conversion unit 48, the recording unit 54 receives the write data signal WT to which is attached the electronic shot mark data converted from the electronic mark data.

In accordance with the write data signal WS, the fixed head 55 writes the time code data and electronic shot mark data to the time code track TC on the recording medium 14 in step S2208. Also in step S2208, the rotary head unit 37 writes the electronic mark data to the video content data based on the write data signal WS before recording the whole data to the recording medium 14.

The process of writing the electronic mark data to the video content data is performed continuously by the editor terminal apparatus 4 or the recording apparatus 2 in steps S2202 through S2208 as long as the recording process in step S1106 of FIG. 11 is in effect.

(4. Video Content Data Editing Process by the Editor Terminal Apparatus 4)

The process of editing video content data performed by the editor terminal apparatus 4 of this invention is described below.

(4.1 Process of Creating Shot Card Data by the Editor Terminal Apparatus 4)

Figure 14:
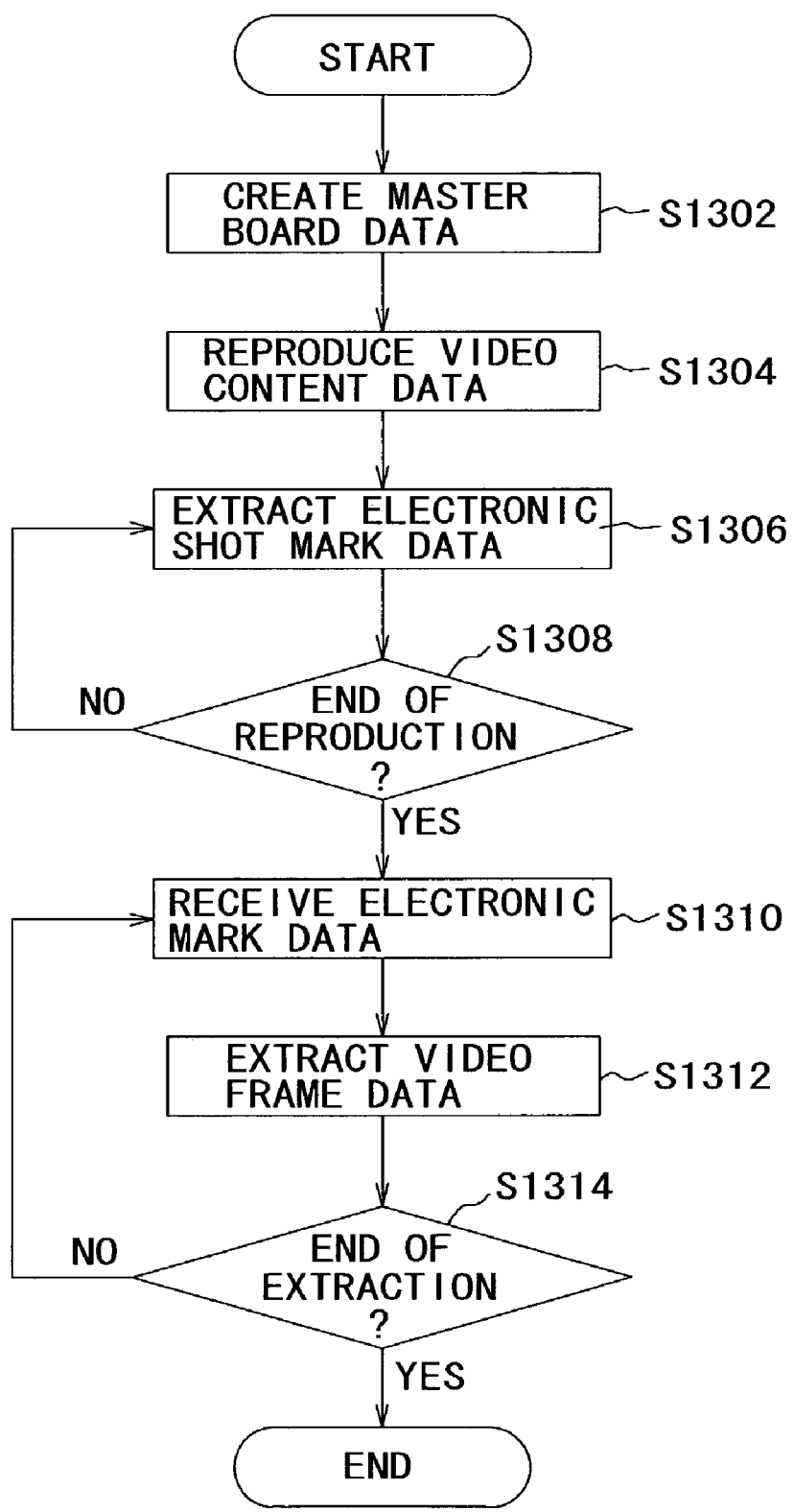
FIG. 14 is a flowchart of steps constituting the process of creating shot card data, performed by the editor terminal apparatus as part of the video content editing support system.

The process of creating shot card data performed by the editor terminal apparatus 4 will now be described with reference to FIG. 14. FIG. 14 is a flowchart of steps constituting a typical process of creating shot card data, performed by the editor terminal apparatus 4 as part of the video content editing support system embodying the invention.

After filming is completed by the recording apparatus 2 with video content data recorded to the recording medium 14, the editor terminal apparatus 4 is switched on. On the activated editor terminal apparatus 4, a medium TD for identifying the recording medium 14 is established and other necessary settings are made in preparation for receiving the recorded video content data from the recording apparatus 2.

Figure 15:
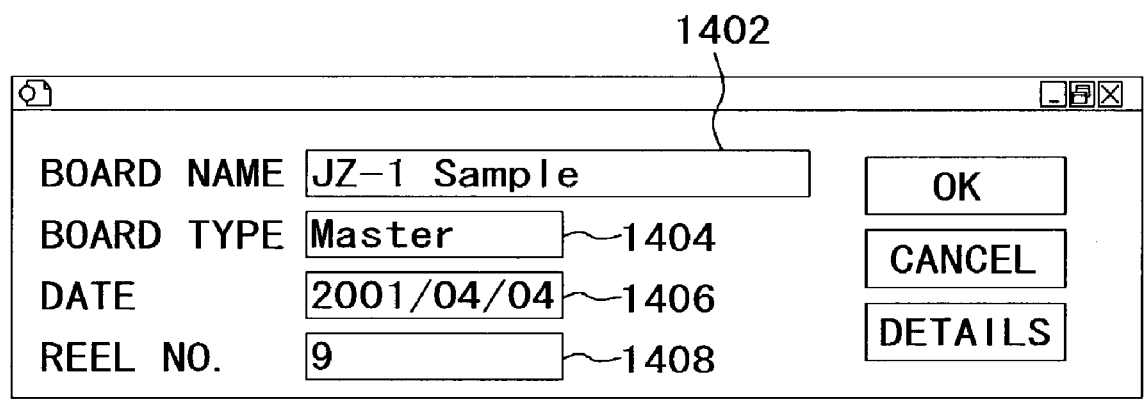
FIG. 15 is an explanatory view showing a typical display of master board data created by the editor terminal apparatus as part of the video content editing support system.

In step S1302 of FIG. 14, the editing unit 26 is used to create master board data for creating shot card data. When master board data are to be created, a display screen for creating master board data shown in FIG. 15 appears on the display unit 22 of the editor terminal apparatus 4. FIG. 15 is an explanatory view showing a typical display of master board data creation on the editor terminal apparatus 4 as part of the video content editing support system embodying the invention.

As shown in FIG. 15, the display screen for master board data creation comprises: a "BOARD NAME" field giving the name of master board data; a "BOARD TYPE" field indicating the type of master board; a "DATE" field denoting the date of creation; and a "REEL NO." field representing the reel number as a medium ID identifying the recording medium 14.

Figure 16:
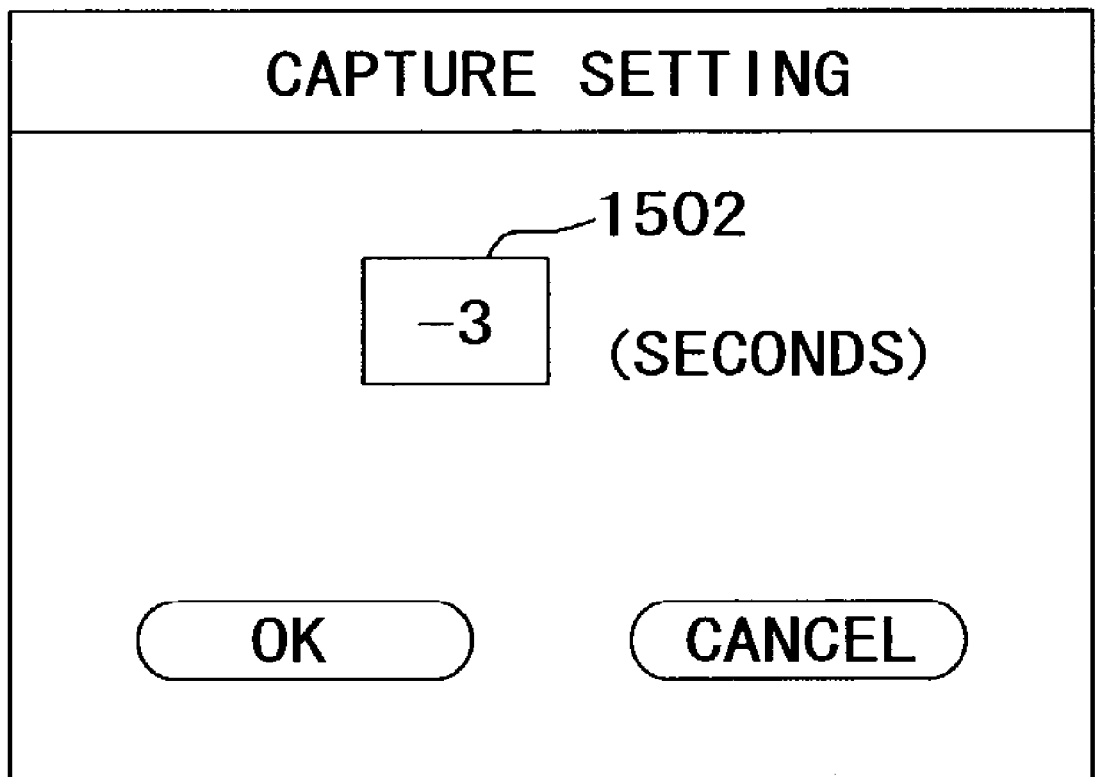
FIG. 16 is an explanatory view depicting a typical display of the timing settings for capturing video data, the display appearing on the editor terminal apparatus as part of the video content editing support system.

When a "DETAILS" button is selected by a mouse or like means on the display screen, the display unit 22 shows a display screen on which to set the timing for capturing the extracted video frame data into the shot card data, as illustrated in FIG. 16.

A timing setting display screen 1500 on which to set the timing for video frame data capture is described below with reference to FIG. 16. As shown in FIG. 16, the screen 1500 includes: a timing input field 1502 in which to set the timing for capturing video frame data; an "OK" button for finalizing the setting; and a "CANCEL" button for canceling the setting.

The value set to the timing input field 1502 designates a predetermined time lag. The setting makes it possible to extract the video frame data having the predetermined time lag before or after those video frame data in the video content data to which the electronic shot mark data have been written.

Where the subject of filming behaves in very rapid movements, the timing of the input through the mark input unit 29 tends to become unsynchronized. In such a case, the reference timeframe in which to extract video frame data may be adjusted using the time lag setting. This allows the video frame data to be extracted in keeping with the electronic mark data.

Suppose that, as shown in FIG. 16, a value "-3" is entered into the timing input field 1502. That setting allows the video frame data to be extracted from a frame position delayed by three seconds from the position of the video frame data to which the electronic mark data have been written.

Following the input of necessary items to the "BOARD NAME" field, "BOARD TYPE" field, "DATE" field, and "REEL NO." field as shown in FIG. 15, selecting the "OK" button with the mouse or like means creates master board data in step S1302 of FIG. 14. A master board data display screen appearing on the display unit 22 will be described later in detail.

With the master board data created in step S1302, step S1304 is reached in which the editor terminal apparatus 4 receives a VTR status signal representing a reproduction state from the recording apparatus 2 and starts reproducing the video content data recorded by the recording apparatus 2. Although this reproduction process is performed by the editor terminal apparatus 4 at a variable speed which is typically faster than in normal reproduction for the ordinary viewing of video content data, this is not limitative of the invention. Alternatively, the reproduction may be carried out by the editor terminal apparatus 4 at normal reproduction speed.

With the reproduction of video content data started in step S1304, the process continues until the applicable video content data recorded on the recording medium 14 have been exhausted. The reproduction unit 61 receives a reproduced signal RS from the fixed head 55, and outputs a reproduced video content data signal RT composed of electronic shot mark data and time code data indicating the positions of electronic shot mark data written to the video content data.

The CPU 67 receives a comparison signal CC from the pattern comparison unit 65. If the received signal CC indicates a match between the electronic shot mark data signal from the comparison pattern generation unit 66 and the user's bit area data DE, then the CPU 67 extracts the matched electronic shot mark data signal in step S1306.

Every time the extracted electronic shot mark data signal is placed into the RAM of the CPU 67, the electronic shot mark data and the time code data in effect at the time of extraction are also stored. Alternatively, the electronic shot mark data may not be placed into the RAM. Instead, each time the electronic shot mark data signal is extracted, the extracted signal may be sent to the control unit 76. From the control unit 76, the extracted electronic shot mark data and time code data may be transmitted through the communication unit 75 to the editor terminal apparatus 4.

The extraction of electronic shot mark data in step S1306 continues until reproduction of the video content data comes to an end. At the end of video content data reproduction in step S1308, with the extraction of electronic shot mark data also terminated, the extracted electronic shot mark data and time code data stored in the RAM are transferred from there to the editor terminal apparatus 4.

The communication unit 21 of the editor terminal apparatus 4 receives the extracted electronic shot mark data and time code data from the recording apparatus 2 as described. The extracted electronic shot mark data and time code data thus received are placed into the storage unit 20.

In order to extract the video frame data and electronic mark data corresponding to the extracted electronic shot mark data and time code data thus stored, the CPU 23 causes the communication unit 21 to send a video content data transmission request signal to the recording apparatus 2.

On receiving the data transmission request signal, the recording apparatus 2 refers to the extracted electronic shot mark data and time code data stored in the RAM of the CPU 67 and positions the recording medium 14 up to the electronic shot mark data and time code data (in a so-called cue-up operation) which have been written to the video content data. The video content data with the synchronized electronic mark data written therein are then transferred to the communication unit 21 through SDI over the network 16.

Although the video content data with the electronic mark data written therein are transferred with respect to all extracted electronic shot mark data and time code data being stored, this is not limitative of the invention. Alternatively, the video content data having the electronic mark data written therein may be transferred regarding only the necessary extracted electronic shot mark data and time code data in storage.

In step S1310, the editing unit 26 receives via the communication unit 21 the video content data with the electronic mark data written therein. In step S1312, the editing unit 26 extracts the electronic mark data based on the received video content data, and extracts video frame data from the video content data in reference to the extracted electronic mark data. The editing unit 26 then creates shot card data constituting title information representative of time codes and video scene characteristics.

Where the timing for video frame data capture is set as discussed above when master board data are to be created, the editing unit 26 extracts video frame data in keeping with the timing in question and with reference to the extracted electronic mark data. A shot card data display screen appearing on the display unit 22 will be described later in detail.

The editing unit 26 continues to receive the electronic mark data (in step S1310) and to extract the video frame data (in step S1312) until the video content data with the electronic mark data written therein have all been transferred and the creation of shot card data has come to an end in step S1314.

In an alternative setup, the recording medium 14 having the electronic mark data and electronic shot mark data written thereon may be subjected to faster variable speed reproduction by another recording apparatus 2 different from the one which made the recordings. Given the reproduced data, another editor terminal apparatus 4 different from the one used to write the electronic mark data may be utilized to create shot card data. That setup provides a more versatile convenience to those involved in editing work.

(4.1.1 Master Board Data Display Screen 1600)

Figure 17:
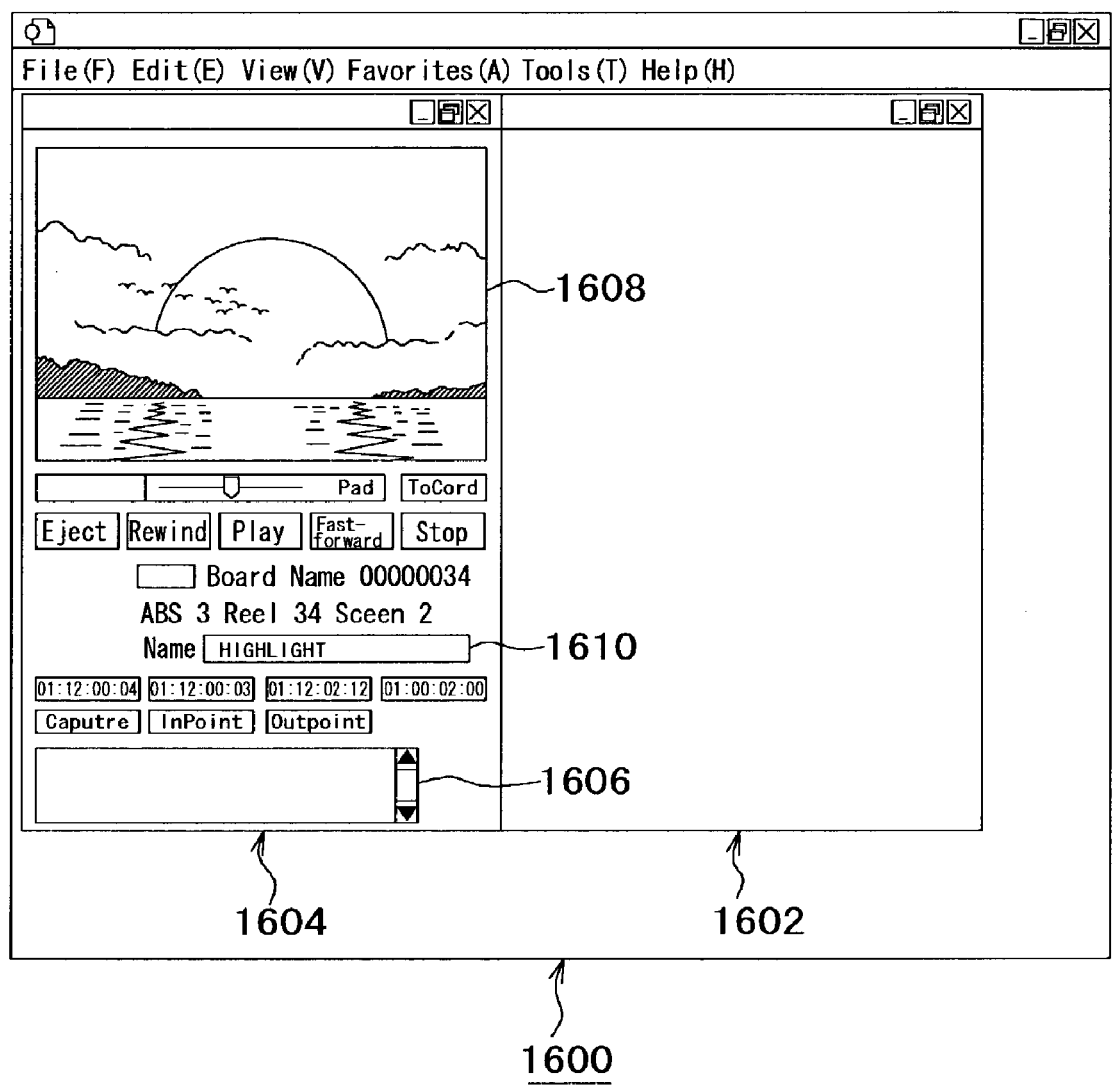
FIG. 17 is an explanatory view illustrating a typical display of master board data appearing on the editor terminal apparatus as part of the video content editing support system.

A display screen 1600 appearing on the display unit 22 showing master board data created by the editing unit 26 will now be described with reference to FIG. 17. FIG. 17 is an explanatory view illustrating a typical display of master board data appearing on the editor terminal apparatus 4 as part of the video content editing support system embodying the invention.

As shown in FIG. 17, the master board data display screen 1600 comprises two principal areas: a video display area 1604, and a shot card data display area 1602 that appears every time shot card data are created.

The video display area 1604 is further made up of a video display field 1608, a message input field 1606, and an electronic mark data display field 1610. The video display field 1608 is where video content data are displayed as they are reproduced, stopped, or otherwise controlled. The message input field 1606 is a field through which to write necessary information with regard to shot card data. The electronic mark data display field 1610 indicates text data content of the electronic mark data having been written.

An "ABS" field appearing in the video display area 1604 shows an absolute number indicating the ordinal position of a particular shot card data item in a sequence of shot card data created from the recorded video content data. A "Reel" field displays the medium ID identifying the recording medium 14. A "Screen" field indicates a relative number representing the ordinal position of this screen in a sequence of screens appearing successively in the shot card data display area.

The electronic mark data display field 1610 displays text data content representative of the electronic mark data extracted from the video content data. It is possible to edit the extracted text data so as to change the electronic mark data written to the recording medium 14.

(4.1.2 Shot Card Data Display Screen)

Figure 18:
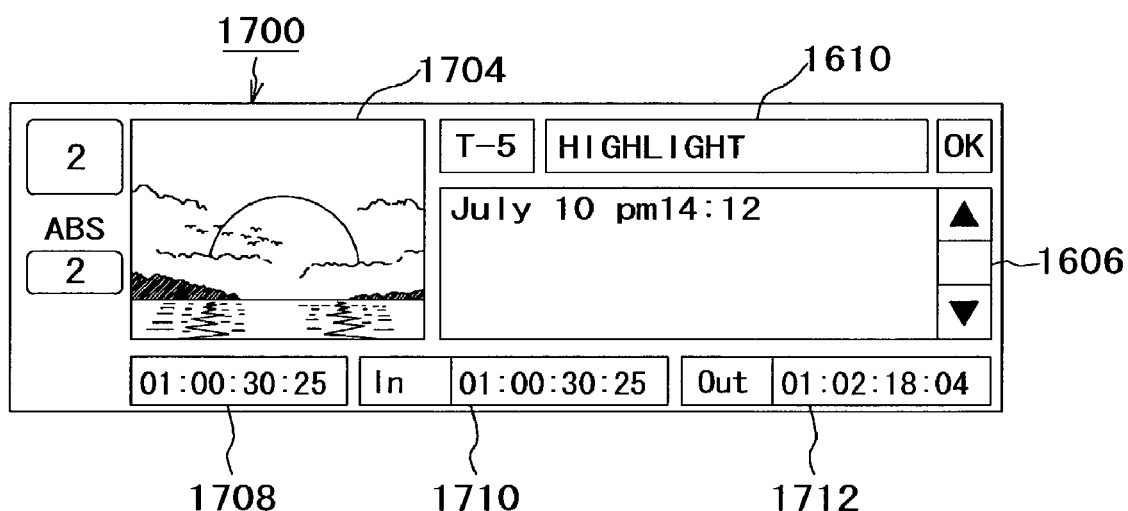
FIG. 18 is an explanatory view indicating a typical display of shot card data appearing on the editor terminal apparatus as part of the video content editing support system.

Described below with reference to FIG. 18 is a display screen 1700 appearing on the display unit 22 indicating shot card data created by the editing unit 26. FIG. 18 is an explanatory view showing a typical display of shot card data appearing on the editor terminal apparatus 4 as part of the video content editing support system embodying the invention.

As illustrated in FIG. 18, the shot card data display screen 1700 comprises: an electronic mark data display area 1610 displaying text content of the electronic mark data following the conversion by the editing unit 26; a message input area 1606; a video display area 1704 displaying extracted video frame data; a time code area 1708 indicating the position at which electronic mark data are written to video content data (called a cue point); an in-point area 1710 showing the time code of an edit start point; and an out-point area 1712 displaying the time code of an edit end point.

The message input area 1606 is where the content entered into the message input field 1606 shown in FIG. 17 is set by the process of shot card data creation performed by the editing unit 26.

Figure 19:
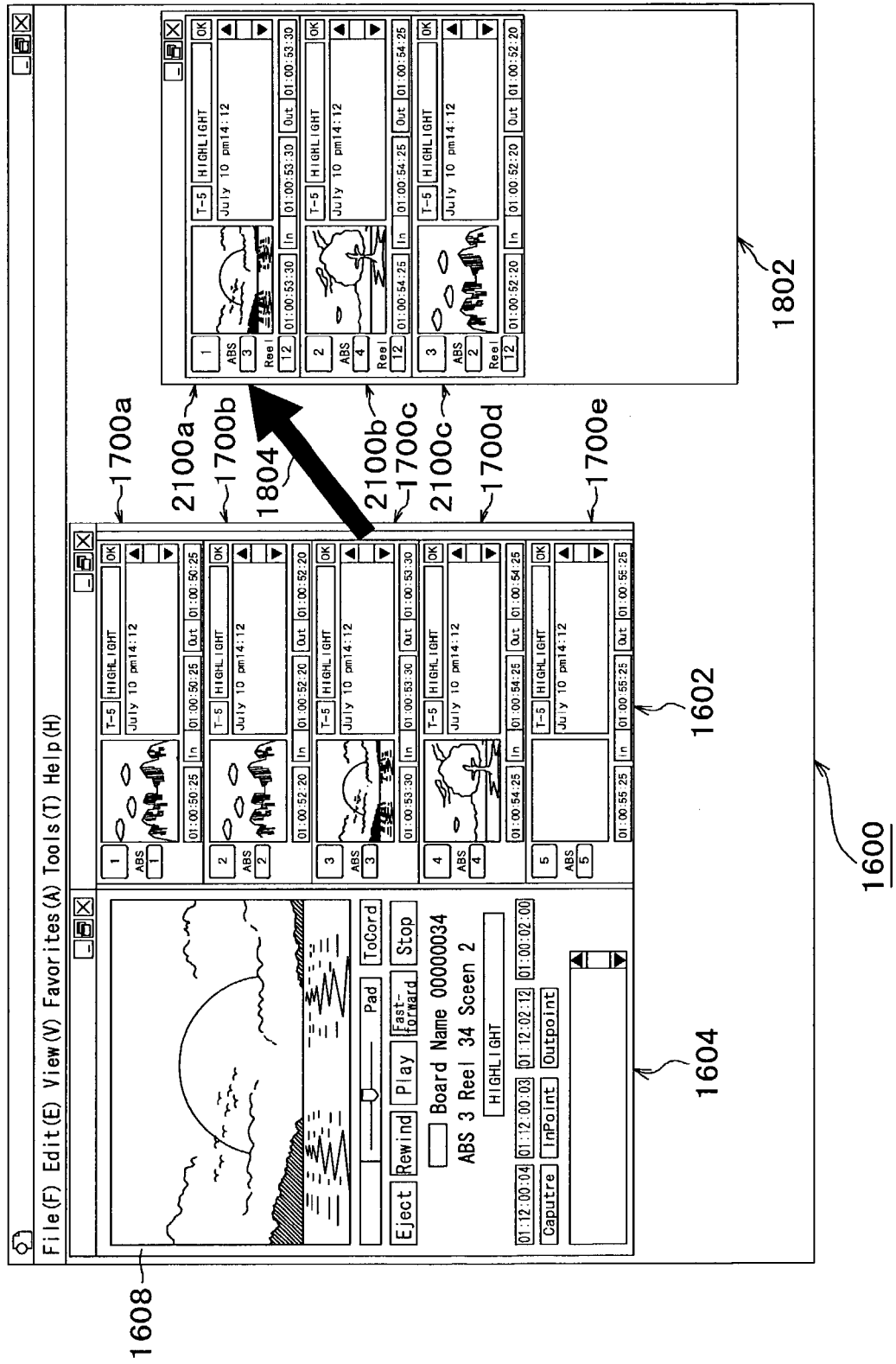
FIG. 19 is an explanatory view indicating a typical display of story board data appearing on the editor terminal apparatus as part of the video content editing support system.

Every time the editing unit 26 of the editor terminal apparatus 4 receives electronic mark data, the editing unit 26 creates the corresponding shot card data. The created data are displayed on the shot card data display screen 1700 in sequence (1700a, 1700b, . . . 1700e) in the shot card data display area 1602, as shown in FIG. 19.

When the extraction of video frame data is judged to be terminated in step S1314 of FIG. 14, the creation of shot card data is brought to an end. Thereafter, story board data are created so that the editor terminal apparatus 4 may directly carry out the rough editing process on the video content data. Story board data will be discussed later in more detail.

The rough editing process is started by selecting from the video content data those video scenes deemed necessary for final editing. The shot card data display screens 1700 (1700*a*, 1700*b*, . . . , 1700*e*) appearing on the shot card data display area 1602 indicate a series of characteristic (i.e., eventful) video scenes out of the video content data.

Thus the appropriate video scenes need only be selected from the shot card data display screens 1700 in the shot card data display area 1602. During the scene selection, the electronic mark data display area 1610 appears on the shot card display screen 1700, whereby scene characteristics can be grasped.

If there exist a plurality of shot card data display screens 1700 in the shot card data display area 1602, it is possible to use the displayed electronic mark data on the electronic mark data display field 1610 of the screens 1700 as the keyword in searching for the video scenes. The search is carried out as follows: a search display screen (not shown) is called up and a suitable keyword associated with the needed video scenes is entered into the screen. This causes the shot card data display screens 1700 corresponding to the keyword to appear.

Thus if the unnecessary shot card data display screens 1700 are deleted from the shot card data display area 1602 to leave only the needed shot card display screens 1700, these steps constitute, at this point in time, a selection (i.e., logging) process of the video scenes deemed necessary for the final editing.

The rough editing process includes a video scene extraction process for determining the edit positions consisting of an edit start point (in-point) and an edit end point (out-point) of each video scene required for the final editing. The video scene extraction process will be described later in more detail.

(4.2 Modification of the Edit Positions of Selected Video Scenes)

The inventive video scene extraction process for determining edit positions will now be described. The process of extracting video scenes is carried out by changing the edit positions involved. The in-point area 1710 and out-point area 1712 indicating the edit positions and appearing on the shot card data display screen 1700 can be modified.

Of the shot card data display screens 1700 (1700*a*, 1700*b*, . . . , 1700*e*) in the shot card data display area 1602 shown in FIG. 19, any desired shot card data display screen 1700 to be changed may be selected by a click of the mouse, followed by a click on a "Play" button. This causes the video content data recorded on the recording medium 14 by the recording apparatus 2 to be "cued" up to the position (cue point) indicated in the time code area 1708. The video content data are then displayed in the video display field 1608.

On the basis of the video content data shown in the video display field 1608, the "In-point" or "Out-point" button is clicked by the mouse at a desired edit position to change the setting in the in-point area 1710 or out-point area 1712.

Figure 20:
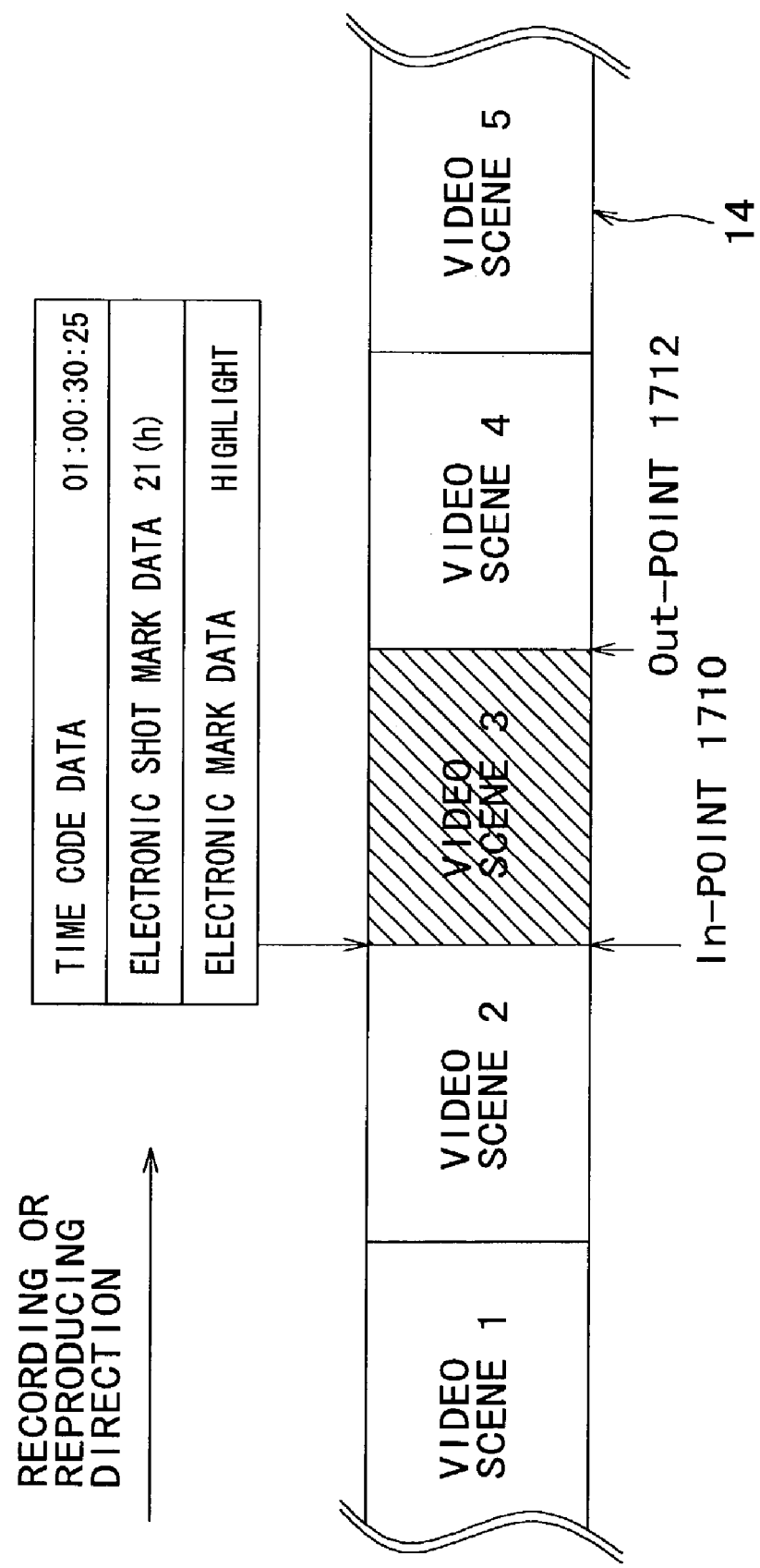
FIG. 20 is an explanatory view sketching a typical structure of the recording medium before its edit points are changed by the video content editing support system.
Figure 21:
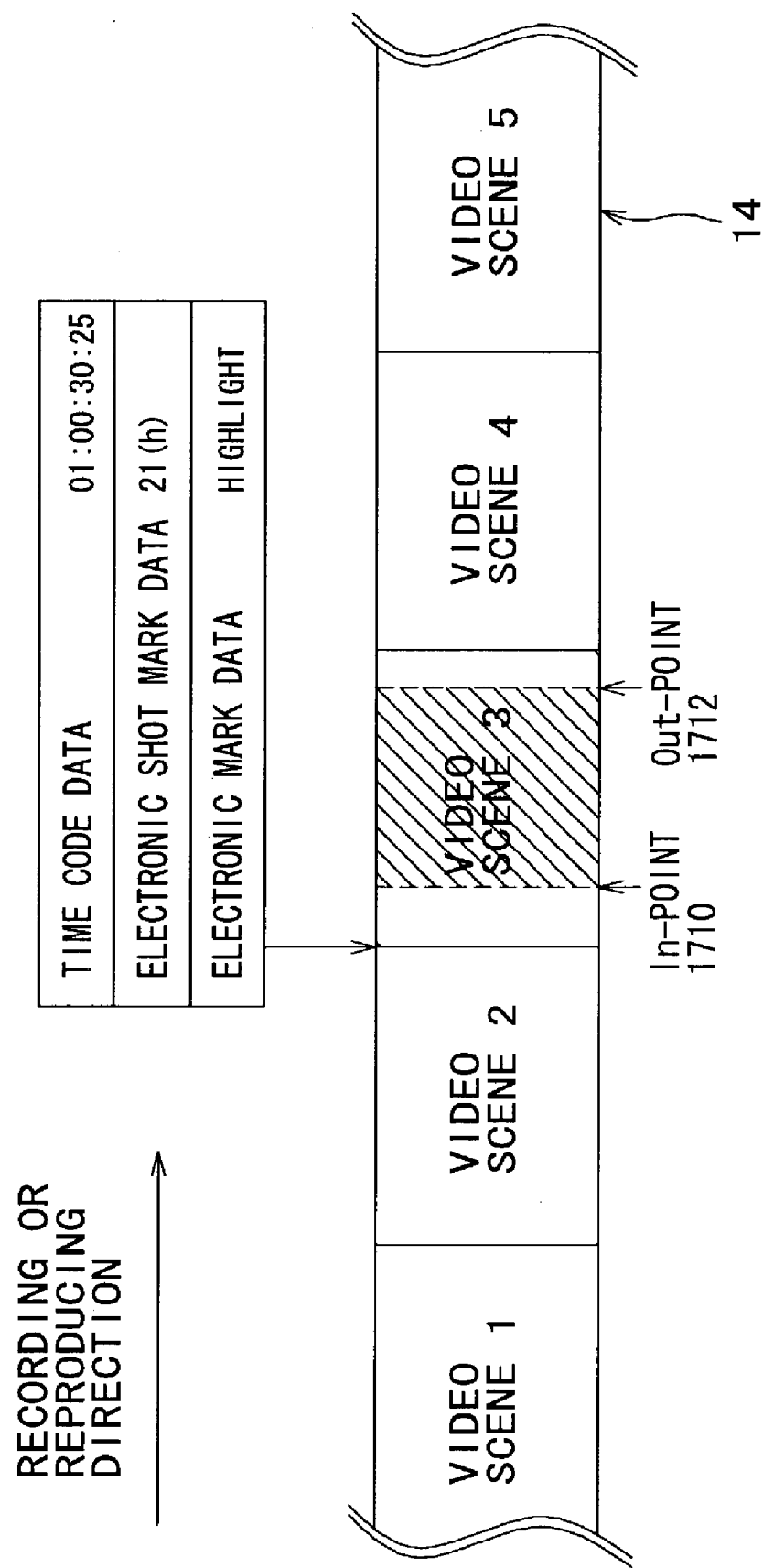
FIG. 21 is an explanatory view showing a typical structure of the recording medium after its edit points have been changed by the video content editing support system.

Described below with reference to FIGS. 20 and 21 is a recording medium 14 on which electronic mark data and some settings of the in-point area 1710 and out-point area 1712 are typically recorded. FIG. 20 is an explanatory view sketching a typical structure of the recording medium 14 before its edit positions are changed, and FIG. 21 is an explanatory view showing a typical structure of the recording medium 14 after its edit positions have been changed according to the invention.

As shown in FIG. 20, the recording medium 14 has the video content data made up of video scenes 1, 2, 5 recorded thereon. Suppose now that electronic mark data are written to the video scene 3. In that case, as indicated in FIG. 20, the in-point 1710 is written at the start of filming (i.e., recording) of the video scene 3 and the out-point 1712 is written at the end of filming of the video scene 4.

Then as discussed above with reference to FIG. 19, the applicable shot card data display screen 1700 to be changed in its edit positions is selected, and the "In-point" or "Out-point" button is suitably input by the mouse to change the in-point 1710 and out-point 1712 settings as desired.

After the edit position change, the recording medium 14 has its in-point 1710 and out-point 1712 changed illustratively as shown in FIG. 21. In the final editing process, the video scene between the changed in-point 1710 and the changed out-point 1712 will be used.

If no electronic mark data were written to the video content data, an attempt to change the edit positions of any video scene would conventionally require the editor to extract visually the scene in question from the video content data. In such a case, the burden on the editor involved in visual scene extraction is considerable. By contrast, writing the electronic mark data to the video content data significantly alleviates the workload on the editor in extracting target video scenes.

(4.3 Creation of Story Board Data)

When the process of shot card data creation is terminated, another process is carried out to create story board data. The story board data creation process involves arranging suitable video scenes into a narrative sequence based illustratively on a scenario, the scenes having been taken out of the video content data for use in the final editing process.

(4.3.1 Story Board Data Display Screen)

Described below with reference to FIG. 19 is a story board data display screen 1802 appearing on the display unit 22. FIG. 19 is an explanatory view indicating a typical display of story board data appearing on the editor terminal apparatus 4 as part of the video content editing support system embodying the invention.

After story board data have been created by the editing unit 26, the display unit 22 displays the story board data display screen 1802 as shown in FIG. 19. The story board data display screen 1802, as depicted in FIG. 19, gives a comprehensive display of story card data display screens 2100 (2100*a*, 2100*b*, 2100*c*). A newly created story board data display screen 1802 displays none of the story card data display screens 2100.

On the story board data display screen 1802, a desired shot card data display screen 1700 is selected by a click of the mouse and dragged in the direction of a black arrow 1804. This causes a story card data display screen 2100 to appear. Selection of the shot card data display screen 1700 may be done by other than a click and a drag by the mouse, illustratively by a double click alone of the mouse.

(4.3.2 Story Card Data Display Screen)

Figure 22:
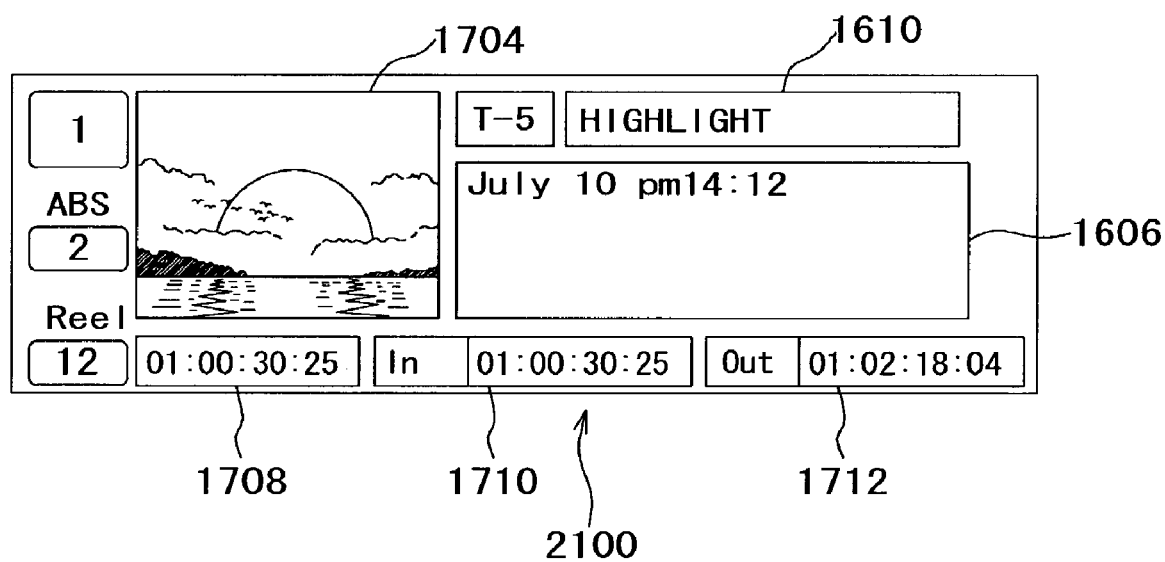
FIG. 22 is an explanatory view showing a typical display of story card data appearing on the editor terminal apparatus as part of the video content editing support system.

The story card data display screen 2100 will now be described with reference to FIG. 22. FIG. 22 is an explanatory view showing a typical display of story card data appearing on the editor terminal apparatus 4 as part of the video content editing support system embodying the invention.

The story card data display screen 2100 appearing on the display unit 22 displays the shot card data created by the editing unit 26 through the conversion process based on the selected shot card data.

As shown in FIG. 22, the story card data display screen 2100 comprises: an electronic mark data display area 1610; a message input area 1606; a video display area 1704 displaying extracted video frame data; a time code area 1708 indicating the position at which electronic mark data are written to video content data (called a cue point); an in-point area 1710 showing the time code of an edit start point; and an out-point area 1712 displaying the time code of an edit end point. This story card data display screen 2100 is substantially the same in structure as the shot card data display screen 1700 and thus will not be described further.

(4.4 Creation of Edit Information Data)

Upon completion of the editing of story board data, the editing unit 26 of the editor terminal apparatus 4 can create edit information data based on the edit information including the edit positions (time codes) of the selected video scenes in the story card data constituting the story board data.

The edit information data may be created illustratively in one of four formats: EDL (Edit Decision List), XML (extensible Markup Language), ALE (Avid Log Exchange), and HTML (Hyper Text Markup Language). With the edit information data thus created, the video content data used as master data in the final editing process may be edited accordingly on an online basis or in other efficient manners.

The edit information data can be stored into a suitable recording medium 12 such as a Memory Stick (registered trademark) shown in FIG. 1. The edit information data can then be retrieved from the medium 12 by an online editing apparatus (not shown) used for final editing. It is also possible to send the edit information data over the network to the online editing apparatus without recourse to the recording medium 12.

In parallel with the recording process, the editor terminal apparatus 4 or recording apparatus 2 writes to the video content data the electronic mark data characterizing the video scenes for use in the final editing process.

After the recording, the electronic shot mark data are detected from the video content data being reproduced. In keeping with the electronic mark data written in the video content data, the video frame data about the extracted video scenes as well as the shot card data carrying title information are created.

The title information carried by the shot card data or the video frame data thus created contribute to efficiently executing the rough editing process in which the desired video scenes for final editing are selected and those deemed unnecessary are discarded (in what is called logging).

It is to be understood that while the invention has been described in conjunction with specific embodiments with reference to the accompanying drawings, it is evident that many alternatives, modifications and variations will become apparent to those skilled in the art in light of the foregoing description. It is thus intended that the present invention embrace all such alternatives, modifications and variations as fall within the spirit and scope of the appended claims.

For example, although the shot card data were shown to be created by the editor terminal apparatus 4 after the recording process, this is not limitative of the invention. Alternatively, the shot card data may be created based on the video content data sent from the recording apparatus 2 in real time as well as on the electronic mark data generated by the input of buttons on the editor terminal apparatus 4.

Whereas the reproduction of data from the recording medium 14 was shown to be carried out at variable speed, this is not limitative of the invention. The data reproduction process may be performed alternatively at the normal speed of reproduction for the ordinary viewing of video content data.

Although electronic shot mark data were shown to be extracted preparatory to creating shot card data, this is not limitative of the invention. Alternatively, the electronic mark data may be extracted in normal speed reproduction and the shot card data may be created accordingly.

While data were shown to be reproduced from the recording medium 14 by the recording apparatus 2 so as to let the editor terminal apparatus 4 create shot card data, this is not limitative of the invention. As an alternative, the shot card data may be created on the basis of the video content data transmitted during onsite recording to the editor terminal apparatus 4 and stored therein.

As described above and according to the invention, regardless of where the filming takes place, necessary video scenes are first selected from the video content data having been recorded and stored, and those portions of the selected video scenes which are deemed usable are further extracted in an appreciably efficient editing process.

What is claimed is:

1. A video content editing support system made up of a recording apparatus for recording captured video content data to a recording medium, and an editor terminal apparatus for displaying said video content data supplied from said recording apparatus, the system comprising:
   a mark table for converting electronic mark data associated with said video content data into electronic shot mark data on a one-to-one correspondence basis;
   a recording unit for writing both said electronic mark data and said electronic shot mark data to said video content data, wherein the electronic mark data is recorded in text form and represents a characteristic of at least one video scene of the video content data; and
   an extraction unit for extracting video data based on said electronic shot mark data written to said video content data,
   wherein the electronic shot mark data in numeric code is recorded to the video content data, and
   wherein the electronic mark data in text form having a one-to-one correspondence to the electronic shot mark data is also recorded to the video content data.

2. A video content editing support system according to claim 1, wherein said recording unit writes said video content data, said electronic mark data, and said electronic shot mark data substantially in real time.

3. A video content editing support system according to claim 1, wherein said extraction unit creates shot card data including title information about said video data on the basis of said electronic mark data.

4. A video content editing support system according to claim 1, wherein said extraction unit creates shot card data including title information about said video data on the basis of said electronic shot mark data written in advance to said video content data.

5. A video content editing support system according to claim 1, wherein said extraction unit extracts video data having a predetermined time lag before and after those video data in said video content data to which said electronic shot mark data have been written.

6. A video content editing support system according to claim 1, wherein said extraction unit creates edit information data based on said shot card data and on said video content data.

7. A recording apparatus for recording to a recording medium video content data to be supplied to an editor terminal apparatus which displays the supplied video content data, said recording apparatus comprising:

a recording unit for writing to said video content data both electronic mark data associated with said video content data and said electronic shot mark data corresponding to said electronic mark data on a one-to-one correspondence basis, the electronic mark data is written in text form and represents a characteristic of at least one video scene of the video content data, wherein the electronic shot mark data in numeric code is recorded to the video content data, and wherein the electronic mark data in text form having a one-to-one correspondence to the electronic shot mark data is also recorded to the video content data.

8. A recording apparatus according to claim 7, wherein said recording unit writes said video content data, said electronic mark data, and said electronic shot mark data substantially in real time.

9. A recording apparatus according to claim 7, wherein said recording unit writes said electronic mark data to a helical track on said recording medium and said electronic shot mark data to a time code track formed longitudinally on said recording medium.

10. A recording apparatus according to claim 7, further comprising a mark table for allowing said electronic shot mark data to correspond on a one-to-one basis to said electronic mark data associated with said video content data.

11. A computer program product, comprising a computer usable medium having a computer-readable program embodied therein, said computer readable program code adapted to be executed, to implement a method of editing video content data, said method comprising:

editing on a video content editor, wherein electronic mark data associated with said video content data and electronic shot mark data corresponding to said electronic mark data on a one-to-one basis are recorded to said recording medium, and wherein the electronic mark data is recorded in text form and represents a characteristic of at least one video scene of the video content data, wherein the electronic shot mark data in numeric code is recorded to the video content data, and wherein the electronic mark data in text form having a one-to-one correspondence to the electronic shot mark data is also recorded to the video content data.

12. An editor terminal apparatus for displaying video content data recorded on a recording medium, said editor terminal apparatus comprising:

a mark table for converting electronic mark data associated with said video content data into electronic shot mark data on a one-to-one correspondence basis; and an extraction unit for extracting video data based on said electronic shot mark data written to said video content data, wherein the electronic mark data is recorded on the recording medium in text form and represents a characteristic of at least one video scene of the video content data, wherein the electronic shot mark data in numeric code is recorded to the video content data, and wherein the electronic mark data in text form having a one-to-one correspondence to the electronic shot mark data is also recorded to the video content data.

13. An editor terminal apparatus according to claim 12, wherein said extraction unit creates shot card data including title information about said video data on the basis of said electronic shot mark data written in advance to said video content data.

14. An editor terminal apparatus according to claim 12, wherein said extraction unit extracts video data having a predetermined time lag before and after those video data in said video content data to which said electronic shot mark data have been written.

15. An editor terminal apparatus according to claim 12, wherein said extraction unit creates edit information data based on said video content data and on said shot card data.

16. A video content editing support method for use with a recording apparatus for recording captured video content data to a recording medium, and an editor terminal apparatus for displaying said video content data supplied from said recording apparatus, the method comprising the steps of:

converting electronic mark data associated with said video content data into electronic shot mark data on a one-to-one correspondence basis;

writing both said electronic mark data and said electronic shot mark data to said video content data, wherein the electronic mark data is written in text form and represents a characteristic of at least one video scene of the video content data; and extracting video data based on said electronic shot mark data written to said video content data, wherein the electronic shot mark data in numeric code is recorded to the video content data, and wherein the electronic mark data in text form having a one-to-one correspondence to the electronic shot mark data is also recorded to the video content data.

17. A video content editing support method according to claim 16, wherein in said writing step, said video content data, said electronic mark data, and said electronic shot mark data are written substantially in real time.

18. A video content editing support method according to claim 16, further comprising the step of creating shot card data including title information about said video data on the basis of said electronic mark data.

19. A video content editing support method according to claim 16, further comprising the step of creating shot card data including title information about said video data on the basis of said electronic shot mark data written in advance to said video content data.

20. A video content editing support method according to claim 16, wherein in said extracting step, video data, having a predetermined time lag before and after those video data in said video content data to which said electronic shot mark data have been written, is extracted.

21. A video content editing support method according to claim 16, further comprising the step of creating edit information data based on said shot card data and on said video content data.

22. The video content editing support system of claim 1, wherein recording the electronic mark data and electronic shot mark data to the video content data is performed continuously as long as the recording apparatus is recording video content data to the recording medium.

23. The video content editing support method of claim 16, wherein writing the electronic mark data and electronic shot mark data to the video content data is performed continuously as long as the recording apparatus is recording video content data to the recording medium.

* * * * *

UNITED STATES PATENT AND TRADEMARK OFFICE
CERTIFICATE OF CORRECTION

PATENT NO. : 7,590,329 B2  Page 1 of 1
APPLICATION NO. : 10/407055
DATED : September 15, 2009
INVENTOR(S) : Shinkai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1285 days.

Signed and Sealed this

Twenty-first Day of September, 2010

David J. Kappos
*Director of the United States Patent and Trademark Office*